United States Patent
Lim et al.

(10) Patent No.: US 11,252,611 B2
(45) Date of Patent: Feb. 15, 2022

(54) APPARATUS AND METHOD FOR DETERMINING BANDWIDTH IN WIRELESS COMMUNICATION SYSTEM

(71) Applicant: Samsung Electronics Co., Ltd., Suwon-si (KR)

(72) Inventors: Chaehee Lim, Suwon-si (KR); Yongok Kim, Seoul (KR); Chanhong Kim, Suwon-si (KR); Jeehwan Noh, Suwon-si (KR); Min Sagong, Suwon-si (KR); Yeohun Yun, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 84 days.

(21) Appl. No.: 16/633,949

(22) PCT Filed: Jul. 25, 2018

(86) PCT No.: PCT/KR2018/008398
§ 371 (c)(1),
(2) Date: Jan. 24, 2020

(87) PCT Pub. No.: WO2019/022494
PCT Pub. Date: Jan. 31, 2019

(65) Prior Publication Data
US 2020/0221348 A1    Jul. 9, 2020

(30) Foreign Application Priority Data

Jul. 25, 2017 (KR) .................. 10-2017-0094411

(51) Int. Cl.
*H04W 4/00* (2018.01)
*H04W 28/20* (2009.01)
(Continued)

(52) U.S. Cl.
CPC ........... *H04W 28/20* (2013.01); *H04L 5/0055* (2013.01); *H04L 61/6022* (2013.01);
(Continued)

(58) Field of Classification Search
CPC ......... H04W 72/0446; H04W 52/0229; H04W 52/02; H04W 52/0216; H04W 84/12; Y02D 30/70
(Continued)

(56) References Cited

U.S. PATENT DOCUMENTS 8,462,761 B2    6/2013  Spinar et al.
2009/0303941 A1*  12/2009  Naka ................ H04W 72/0406
                                                370/329
(Continued)

FOREIGN PATENT DOCUMENTS

KR       10-1398943 B1       5/2014
KR    10-2014-0103298 A      8/2014
WO       2010090474 A2       8/2010

OTHER PUBLICATIONS

ISA/KR, International Search Report and Written Opinion of the International Searching Authority, International Application No. PCT/KR2018/008398, dated Jan. 24, 2019, 17 pages.
(Continued)

*Primary Examiner* — Mang Hang Yeung

(57) ABSTRACT

The disclosure relates to a pre-5th-generation (5G) or 5G communication system to be provided for supporting higher data rates beyond 4th-generation (4G) communication system such as long term evolution (LTE). Provided are an apparatus and a method for determining a bandwidth in a wireless communication system. A method of operating a base station (BS) in a wireless communication system includes: receiving information on a bandwidth supporting capability of a terminal from the terminal; transmitting
(Continued)

information on at least one candidate bandwidth corresponding to the bandwidth supporting capability to the terminal; and transmitting information indicating a utilization bandwidth of the terminal among the at least one candidate bandwidth to the terminal. Accordingly, it is possible to reduce power consumption of the terminal and overhead for a bandwidth indication.

24 Claims, 18 Drawing Sheets

(51) Int. Cl.
    *H04W 76/27* (2018.01)
    *H04L 5/00* (2006.01)
    *H04L 29/12* (2006.01)
    *H04W 72/04* (2009.01)

(52) U.S. Cl.
    CPC ..... *H04W 72/042* (2013.01); *H04W 72/0446* (2013.01); *H04W 76/27* (2018.02)

(58) Field of Classification Search
    USPC .......................................................... 370/329
    See application file for complete search history.

(56) References Cited

U.S. PATENT DOCUMENTS

| | | |
|---|---|---|
| 2011/0255485 A1 | 10/2011 | Chen et al. |
| 2011/0286420 A1* | 11/2011 | Cho ................... H04W 74/004 370/329 |
| 2012/0176926 A1 | 7/2012 | Jang et al. |
| 2013/0142139 A1 | 6/2013 | Kitazoe et al. |
| 2015/0055588 A1* | 2/2015 | Yerramalli ........ H04W 72/0446 370/329 |
| 2018/0054753 A1* | 2/2018 | Fujishiro ........... H04W 28/0215 |
| 2020/0059345 A1* | 2/2020 | Pelletier ................ H04L 1/1657 |

OTHER PUBLICATIONS

Samsung, "Bandwidth Adaptation for UE Power Saving," R1-1705387, 3GPP TSG RAN WG1 meeting #88bis, Spokane, USA, Apr. 3-7, 2017, 3 pages.

Notice of Preliminary Rejection dated Nov. 29, 2021, in connection with Korean Application No. 10-2017-0094411, 11 pages.

* cited by examiner

APPARATUS AND METHOD FOR DETERMINING BANDWIDTH IN WIRELESS COMMUNICATION SYSTEM

CROSS-REFERENCE TO RELATED APPLICATIONS

This application is a 371 National Stage of International Application No. PCT/KR2018/008398 filed on Jul. 25, 2018, which claims priority to Korean Patent Application No. 10-2017-0094411, filed Jul. 25, 2017, the disclosures of which are herein incorporated by reference in their entireties.

BACKGROUND

1. Field

The present disclosure relates generally to a wireless communication system and, more particularly, to an apparatus and a method for determining a bandwidth in a wireless communication system.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'post long term evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

A base station (BS) may allocate resources to a terminal within a system bandwidth of the BS in order to perform data communication with the terminal. When the terminal performs data communication through a wide bandwidth such as a system bandwidth, a rate of the data communication of the terminal may increase. However, data communication through the wide bandwidth may cause a large amount of power consumption of the terminal.

SUMMARY

Based on the discussion, the present disclosure provides an apparatus and a method for determining a bandwidth in a wireless communication system.

The present disclosure provides an apparatus and a method for bandwidth adaptation in a wireless communication system.

The present disclosure provides an apparatus and a method for adaptively determining a utilization bandwidth of a terminal in a wireless communication system.

The present disclosure provides an apparatus and a method for transmitting information on a bandwidth supporting capability to a BS by a terminal in a wireless communication system.

The present disclosure provides an apparatus and a method for transmitting information on a candidate bandwidth to a terminal by a BS in a wireless communication system.

The present disclosure provides an apparatus and a method for transmitting information indicating a utilization bandwidth of a terminal to the terminal by a BS in a wireless communication system.

In accordance with an aspect of the present disclosure, a method of operating a base station (BS) in a wireless communication system is provided. The method includes: receiving information on a bandwidth supporting capability of a terminal from the terminal; transmitting information on at least one candidate bandwidth corresponding to the bandwidth supporting capability to the terminal; and transmitting information indicating a utilization bandwidth of the terminal among the at least one candidate bandwidth to the terminal.

In accordance with another aspect of the present disclosure, a base station (BS) in a wireless communication system is provided. The BS includes a transceiver configured to receive information on a bandwidth supporting capability of a terminal from the terminal, transmit information on at least one candidate bandwidth corresponding to the bandwidth supporting capability to the terminal, and transmit information indicating a utilization bandwidth of the terminal among the at least one candidate bandwidth to the terminal.

In accordance with another aspect of the present disclosure, a method of operating a terminal in a wireless communication system is provided. The method includes: transmitting information on a bandwidth supporting capability of the terminal to a base station (BS); receiving information on at least one candidate bandwidth corresponding to the bandwidth supporting capability from the BS; and receiving information indicating a utilization bandwidth of the terminal among the at least one candidate bandwidth from the BS.

In accordance with another aspect of the present disclosure, a terminal in a wireless communication system is provided. The terminal includes a transceiver configured to transmit information on a bandwidth supporting capability of the terminal to a base station (BS), receive information on at least one candidate bandwidth corresponding to the bandwidth supporting capability from the BS, and receive information indicating a utilization bandwidth of the terminal among the at least one candidate bandwidth from the BS.

An apparatus and a method according to various embodiments of the present disclosure can reduce power consumption of the terminal and also reduce overhead for a bandwidth indication as the BS adaptively indicates a utilization bandwidth of the terminal to the terminal and the terminal communicates with the BS through the indicated utilization bandwidth.

Effects which can be acquired by the present disclosure are not limited to the above described effects, and other effects that have not been mentioned may be clearly understood by those skilled in the art from the following description.

DETAILED DESCRIPTION

The terms used in the present disclosure are only used to describe specific embodiments, and are not intended to limit the present disclosure. A singular expression may include a plural expression unless they are definitely different in a context. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

Hereinafter, various embodiments of the present disclosure will be described based on an approach of hardware. However, various embodiments of the present disclosure include a technology that uses both hardware and software and thus, the various embodiments of the present disclosure may not exclude the perspective of software.

Hereinafter, the present disclosure relates to an apparatus and a method for determining a bandwidth (BW) in a wireless communication system. Specifically, the present disclosure describes technology for adaptively determining a utilization bandwidth of a terminal in a wireless communication system. According to various embodiments of the present disclosure, the terms "bandwidth" and "band" may be interchangeable used, and the term "bandwidth" may be understood as a concept including not only a width of a band but also a location of a band (that is, a location of a band in the entire frequency domain) and a central frequency of a band.

The terms referring to a signal used in the following description, the terms referring to a channel, the terms referring to control information, the terms referring to network entities, and the terms referring to elements of a device are used only for convenience of description. Accordingly, the present disclosure is not limited to the following terms and other terms having the same technical meaning may be used.

Further, the present disclosure describes various embodiments using the terms used by some communication standards (for example, $3^{rd}$ generation partnership project (3GPP)), but this is only an example. Various embodiments of the present disclosure may be easily modified and applied to other communication systems.

Figure 1:
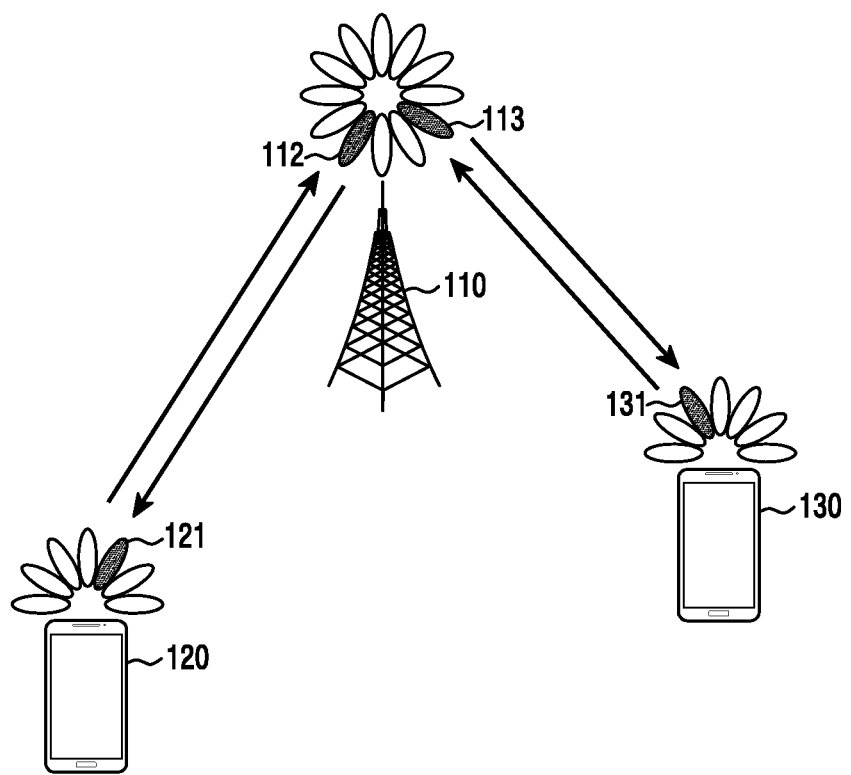
FIG. 1 illustrates a wireless communication system according to various embodiments of the present disclosure.

FIG. 1 illustrates a wireless communication system according to various embodiments of the present disclosure. In FIG. 1, a base station (BS) 110, a terminal 120, and a terminal 130 are illustrated as some of the nodes using a wireless channel in a wireless communication system. FIG. 1 illustrates only one BS, but another BS, which is the same as or similar to the BS 110, may be further included.

The BS 110 is a network infrastructure element that provides wireless access to the terminals 120 and 130. The BS 110 has a coverage defined for a predetermined geographical region based on the distance at which a signal can be transmitted. The BS 110 may be referred to as "access point (AP)", "evolved NodeB (eNB)", "$5^{th}$ generation (5G) node", "wireless point", "transmission/reception point (TRP)", or another term having an equivalent meaning thereto as well as "base station".

Each of the terminals 120 and 130 is a device used by a user, and performs communication with the BS 110 through a wireless channel. Depending on the case, at least one of the terminals 120 and 130 may operate without user involvement. That is, at least one of the terminals 120 and 130 may be a device that performs machine-type communication (MTC), and may not be carried by the user. Each of the terminals 120 and 130 may be referred to as "user equipment (UE)", "mobile station", "subscriber station", "remote terminal", "wireless terminal", "user device", or other terms having the equivalent technical meaning, as well as "terminal".

The BS 110, the terminal 120, and the terminal 130 may transmit and receive wireless signals in millimeter-wave (mmWave) bands (for example, 28 GHz, 30 GHz, 38 GHz, and 60 GHz). At this time, in order to increase a channel gain, the BS 110, the terminal 120, and the terminal 130 may perform beamforming. The beamforming may include transmission beamforming and reception beamforming. That is, the BS 110, the terminal 120, and the terminal 130 may assign directivity to a transmission signal and a reception signal. To this end, the BS 110 and the terminals 120 and 130 may select serving beams 112, 113, 121, and 131 through a beam search procedure or beam management procedure. After the serving beams 112, 113, 121, and 131 are selected, communication may be performed through resources having a quasi-co-located (QCL) relation with resources through which the serving beams 112, 113, 121, and 131 are transmitted.

Figure 2:
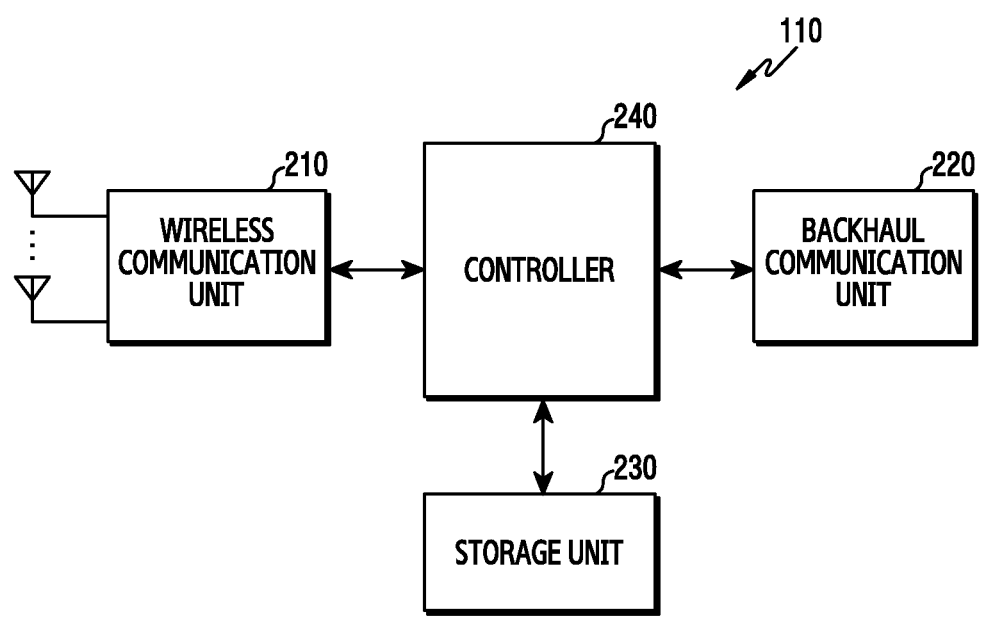
FIG. 2 illustrates the configuration of a BS in a wireless communication system according to various embodiments of the present disclosure.

FIG. 2 illustrates the configuration of a BS in a wireless communication system according to various embodiments of the present disclosure. The configuration illustrated in FIG. 2 may be understood as the configuration of the BS 110. The suffix "-unit" or "-er" used hereinafter may refer to a unit for processing at least one function or operation, and may be implemented as hardware, software, or a combination of hardware and software.

Referring to FIG. 2, the BS 110 may include a wireless communication unit 210, a backhaul communication unit 220, a storage unit 230, and a controller 240.

The wireless communication unit 210 performs functions for transmitting and receiving signals through a wireless channel. For example, the wireless communication unit 210 performs a function of conversion between a baseband signal and a bit stream according to a physical layer standard of the system. For example, when data is transmitted, the wireless communication unit 210 generates complex symbols by encoding and modulating a transmission bit stream. Further, when data is received, the wireless communication unit 210 restores a reception bit stream by demodulating and decoding a baseband signal. In addition, the wireless communication unit 210 up-converts a baseband signal into a radio-frequency (RF) band signal and transmits the same through an antenna, and down-converts an RF band signal received through an antenna into a baseband signal.

To this end, the wireless communication unit 210 may include a transmission filter, a reception filter, an amplifier, a mixer, an oscillator, a digital-to-analog convertor (DAC), an analog-to-digital convertor (ADC), and the like. According to various embodiments of the present disclosure, the wireless communication unit 210 may include a plurality of transmission filters and/or reception filters having different operational frequencies in order to perform communication in various bandwidths. Further, the wireless communication unit 210 may include a plurality of transmission/reception paths. In addition, the wireless communication unit 210 may include at least one antenna array consisting of a plurality of antenna elements. On the hardware side, the wireless communication unit 210 may include a digital unit and an analog unit, and the analog unit may include a plurality of sub-units according to operation power, operation frequency, and the like.

The wireless communication unit 210 transmits and receives the signal as described above. Accordingly, some or all of the wireless communication unit 210 may be referred to as a "transmitter", a "receiver", or a "transceiver". Also, the transmission and reception performed through a wireless channel, which is described in the following descriptions, may be understood to mean that the above-described processing is performed by the communication unit 210.

The backhaul communication unit 220 provides an interface for performing communication with other nodes within the network. That is, the backhaul communication unit 220 converts bitstreams transmitted to another node, for example, another access node, another BS, a higher node, or a core network, from the BS 110 into a physical signal and converts the physical signal received from the other node into the bitstreams.

The storage unit 230 stores a basic program, an application, and data such as setting information for the operation of the BS 110. The storage unit 230 may be configured as volatile memory, non-volatile memory, or a combination of volatile memory and non-volatile memory. Further, the storage unit 230 provides stored data in response to a request from the controller 240.

The controller 240 controls the general operation of the BS 110. For example, the controller 240 transmits and receives a signal through the wireless communication unit 210 or the backhaul communication unit 220. Further, the controller 240 records data in the storage unit 230 and reads the recorded data. The controller 240 may perform functions of a protocol stack required in the communication standards. To this end, the controller 240 may include at least one processor.

According to various embodiments, the controller 240 may control the wireless communication unit 210 to receive information on a bandwidth supporting capability of the terminal from the terminal, transmit information on at least one candidate bandwidth corresponding to the bandwidth supporting capability to the terminal, and transmit information indicating a utilization bandwidth of the terminal among the at least one candidate bandwidth to the terminal. For example, the controller 240 may control the BS 110 to perform the operations described below according to various embodiments.

Figure 3:
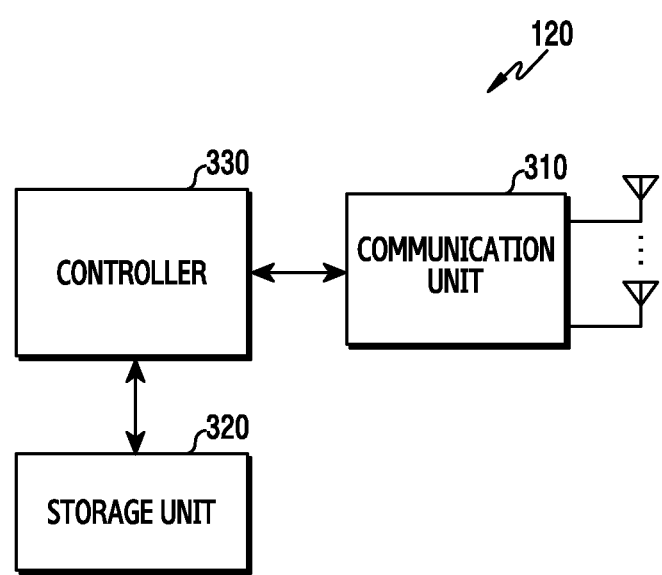
FIG. 3 illustrates the configuration of a terminal in a wireless communication system according to various embodiments of the present disclosure.

FIG. 3 illustrates the configuration of a terminal in a wireless communication system according to various embodiments of the present disclosure. The configuration illustrated in FIG. 3 may be understood as the configuration of the terminal 120. The suffix "-unit" or "-er" used hereinafter may refer to a unit for processing at least one function or operation, and may be implemented as hardware, software, or a combination of hardware and software.

Referring to FIG. 3, the terminal 120 includes a communication unit 310, a storage unit 320, and a controller 330.

The communication unit 310 performs functions for transmitting/receiving a signal through a wireless channel. For example, the communication unit 310 performs a function of conversion between a baseband signal and a bit stream according to a physical layer standard of the system. For example, when data is transmitted, the communication unit 310 generates complex symbols by encoding and modulating a transmission bit stream. Further, when data is received, the communication unit 310 restores a reception bit stream by demodulating and decoding a baseband signal. In addition, the communication unit 310 up-converts a baseband signal into an RF band signal and then transmits the RF band signal through an antenna, and down-converts an RF band signal received through the antenna into a baseband signal.

For example, the wireless communication unit 310 may include a transmission filter, a reception filter, an amplifier, a mixer, an oscillator, a DAC, an ADC, and the like.

Further, the communication unit 310 may include a plurality of transmission/reception paths. In addition, the communication unit 310 may include at least one antenna array consisting of a plurality of antenna elements. On the hardware side, the communication unit 310 may include a digital circuit and an analog circuit (for example, a Radio Frequency Integrated Circuit: RFIC). The digital circuit and the analog circuit may be implemented as one package. The communication unit 310 may include a plurality of RF chains. The communication unit 310 may perform beamforming.

The communication unit 310 may include different communication modules to process signals in different frequency bands. For example, the communication unit 310 may include a plurality of transmission filters and/or reception filters having different operational frequencies in order to perform communication in various bandwidths.

The communication unit 310 transmits and receives the signal as described above. Accordingly, all or some of the communication unit 310 may be referred to as a "transmitter", a "receiver", or a "transceiver". Also, the transmission and reception performed through a wireless channel, which is described in the following descriptions, may be understood to mean that the above-described processing is performed by the communication unit 310.

The storage unit 320 stores data such as a basic program, an application program, and setting information for the operation of the terminal 120. The storage unit 320 may be configured as volatile memory, non-volatile memory, or a combination of volatile memory and non-volatile memory. Further, the storage unit 320 provides stored data in response to a request from the controller 330.

The controller 330 controls the general operation of the terminal 120. For example, the controller 330 transmits and receives a signal through the communication unit 310. Further, the controller 330 records data in the storage unit 320 and reads the recorded data. In addition, the controller 330 may perform functions of a protocol stack required by the communication standard. To this end, the controller 330 may include at least one processor or microprocessor, or may play the part of the processor. Further, the part of the communication unit 310 or the controller 330 may be referred to as a communication processor (CP).

According to various embodiments, the controller 330 may transmit information on a bandwidth supporting capability of the terminal 120 from the BS 110, receive information on at least one candidate bandwidth corresponding to the bandwidth supporting capability from the BS 110, and receive information indicating a utilization bandwidth of the terminal 120 among the at least one candidate bandwidth from the BS 110. For example, the controller 330 may control the terminal to perform the operations described below according to various embodiments.

In order to achieve a high data transmission rate, a wide bandwidth may be used in wireless communication (for example, wireless communication between the BS 110 and the terminal 120). For example, in a millimeter wave (mm-Wave) band, a wide bandwidth of about 400 MHz may be used per component carrier (CC).

When a system bandwidth of the BS matches a reception bandwidth of the terminal, the terminal may receive a downlink signal by performing a radio frequency (RF) filtering and fast fourier transform (FFT) corresponding to the system bandwidth indicated by the BS. The system bandwidth may be indicated by a main information block (MIB) which the terminal receives from the BS through a physical broadcast channel (PBCH). However, when the terminal receives a signal through the entire system bandwidth of the BS, power consumption of the terminal may increase. Since resources of the terminal are seldom allocated to the entire system bandwidth of the BS, reception of the signal by the terminal through the entire system bandwidth of the BS may be inefficient in the light of power consumption of the terminal. Further, the terminal may not receive the signal in all or some of the entire system bandwidth of the BS according to a bandwidth supporting capability of the terminal.

Accordingly, various embodiments of the present disclosure provide an apparatus and a method for performing bandwidth adaptation. The term "bandwidth adaption" may mean that a UE-specific bandwidth (or a UE bandwidth or a terminal bandwidth) is adaptively configured in each terminal according to circumstances (for example, when an amount of traffic to be transmitted to the terminal or from the terminal is large or small) and the terminal receives or transmits a signal through the configured bandwidth rather than the entire bandwidth of the BS. Depending on the bandwidth adaptation, the terminal may efficiently operate in the light of at least power consumption.

For example, a maximum supportable bandwidth of the terminal may be defined within a range of the system bandwidth of the BS. In other words, the maximum supportable bandwidth of the terminal may be equal to or narrower than the system bandwidth of the BS. In the bandwidth adaptation, the BS may indicate a UE bandwidth within the range of the maximum supportable bandwidth of the terminal to the terminal and allocate a physical downlink control channel (PDCCH) and/or physical downlink shared channel (PDSCH) to be received by the terminal within the range of the UE bandwidth. In this case, the terminal may not receive information allocated to a bandwidth out of the range of the UE bandwidth indicated by the BS.

Hereinafter, signal procedures of the BS and the terminal for the bandwidth adaptation will be described. More specifically, hereinafter, a method by which the terminal feeds back information related to the terminal (for example, information on the bandwidth supporting capability) for the bandwidth adaptation and a method by which the BS indicates the UE bandwidth will be described.

Figure 4:
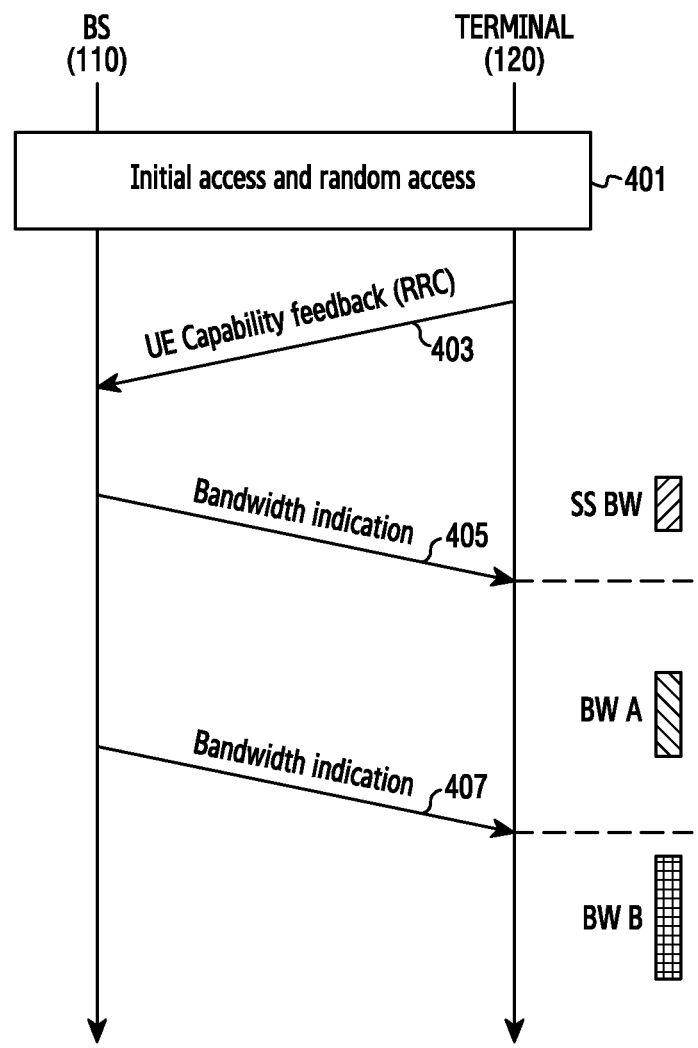
FIG. 4 illustrates a signal flow for bandwidth adaptation in a wireless communication system according to various embodiments of the present disclosure.

FIG. 4 illustrates a signal flow for the bandwidth adaptation in a wireless communication system according to various embodiments of the present disclosure. FIG. 4 illustrates the operation of the BS 110 and the terminal 120.

Referring to FIG. 4, in step 401, the BS 110 and the terminal 120 perform initial access and/or random access. In the initial access and/or random access processes, the terminal may receive an MIB indicating a system bandwidth of the BS through a PBCH.

In step 403, the terminal 120 transmits a UE capability feedback to the BS 110 (or the BS 110 receives a UE capability feedback from the terminal 120). The UE capability feedback includes information on a bandwidth supporting capability of the terminal 120, and the bandwidth supporting capability may refer to the type and size of a bandwidth which the terminal 120 can support. Since there is an area in which the terminal 120 cannot receive a signal in the system bandwidth depending on the bandwidth supporting capability of the terminal 120, the BS 110 may be required to receive a UE capability feedback from the terminal 120 in order to determine a bandwidth to which information (for example, a PDCCH or PDSCH) to be received by the terminal 120 is allocated even after the system bandwidth is indicated to the terminal 120. Accordingly, after performing initial access and random access in step 401, the BS 110 may receive UE feedback from the terminal 120 and allocate downlink resources of the terminal 120 within a Synchronization bandwidth (SS bandwidth) range before newly indicating the UE bandwidth to the terminal 120. The SS bandwidth may be the narrowest bandwidth among supportable bandwidths of the terminal 120. The UE capability feedback may be transmitted or received through radio resource control (RRC).

In step 405, the BS 110 transmits a bandwidth indication to the terminal 120. The BS 110 may indicate the UE bandwidth to the terminal 120 through the bandwidth indication. For example, as illustrated in FIG. 4, when a bandwidth A is indicated to the terminal 120 using the SS bandwidth, a utilization bandwidth of the terminal 120 may be changed from the SS bandwidth to the bandwidth A. According to various embodiments of the present disclosure, the "utilization bandwidth" is a bandwidth which the terminal 120 actually uses to communicate with the BS 110, and the BS 110 allocates information to be received by the terminal 120 to the utilization bandwidth. According to the present disclosure, the utilization bandwidth may be used as the same meaning as the UE bandwidth or the terminal bandwidth. In other words, the bandwidth indication may include information indicating the utilization bandwidth of the terminal 120.

In step 407, the BS 110 transmits the bandwidth indication to the terminal 120. For example, the BS 110 may indicate a bandwidth B as the UE bandwidth to the terminal 120 through the bandwidth indication in step 407. As illustrated in FIG. 4, when the bandwidth B is indicated to the terminal 120 using the bandwidth A, the utilization bandwidth of the terminal 120 may be changed from the bandwidth A to the bandwidth B.

Although not illustrated, in order to change the utilization bandwidth of the terminal 120, a transition time may be needed. For example, the transition time may be a time required for controlling reception filters and/or transmission filters of the terminal 120 in order to change the bandwidth through which the terminal 120 receives a signal. When the transition time is required, the utilization bandwidth of the terminal 120 may not be changed immediately after the bandwidth indication is received from the BS 120 but may be changed when the transition time passes after the bandwidth indication is received.

In order to reduce power consumption of the terminal, it is required to dynamically perform the bandwidth adaptation in consideration of an amount of traffic varying depending on time. In other words, it is required to dynamically perform the bandwidth indication (for example, the bandwidth indication in step 405 and step 407) for the bandwidth adaptation through a media access control (MAC) control element (CE) and/or downlink control information (DCI). However, when a large amount of detailed information related to the bandwidth such as a central frequency of the bandwidth is indicated through the MAC CE and/or DCI for the bandwidth indication, a large amount of overhead may be generated. Particularly, when the number of bandwidths which the terminal can support is large, the overhead may further increase.

Accordingly, bandwidth adaptation setting may be defined separately from the bandwidth indication in order to reduce overhead through the MAC CE and/or DCI according to various embodiments of the present disclosure. In other words, in order to indicate the utilization bandwidth to the terminal, the BS according to various embodiments of the present disclosure may first transmit the bandwidth adaptation setting to the terminal through RRC and then transmit the bandwidth indication to the terminal through RRC, MAC CE and/or DCI. The "bandwidth adaptation setting" is information related to at least one candidate bandwidth corresponding to the bandwidth supporting capability of the terminal, and at least one candidate bandwidth corresponding to the bandwidth supporting capability of the terminal may be at least one bandwidth which can be a candidate of the utilization bandwidth and may be determined among from the supportable bandwidths of the terminal. According to various embodiments of the present disclosure, the bandwidth adaptation setting may include at least one piece of the following detailed information.

list of candidate bandwidths determined among from supportable bandwidths of terminal configuration (numerology) information (for example, subcarrier interval) of each candidate bandwidth default bandwidth to be used before bandwidth indication bandwidth indication scheme (for example, RRC, MAC CE, or DCI)

In other words, the BS may first transmit the bandwidth adaptation setting to the terminal through RRC and then transmit the bandwidth indication to the terminal through RRC, MAC CE, and/or DCI, so as to reduce overhead of information to be included in the bandwidth indication. According to various embodiments of the present disclosure, transmission of the bandwidth indication without transmission of the bandwidth adaptation setting for bandwidth adaptation may be referred to as "single stage bandwidth adaption", and transmission of the bandwidth adaptation setting and the bandwidth indication for bandwidth adaptation may be referred to as "dual stage bandwidth adaptation".

Figure 5:
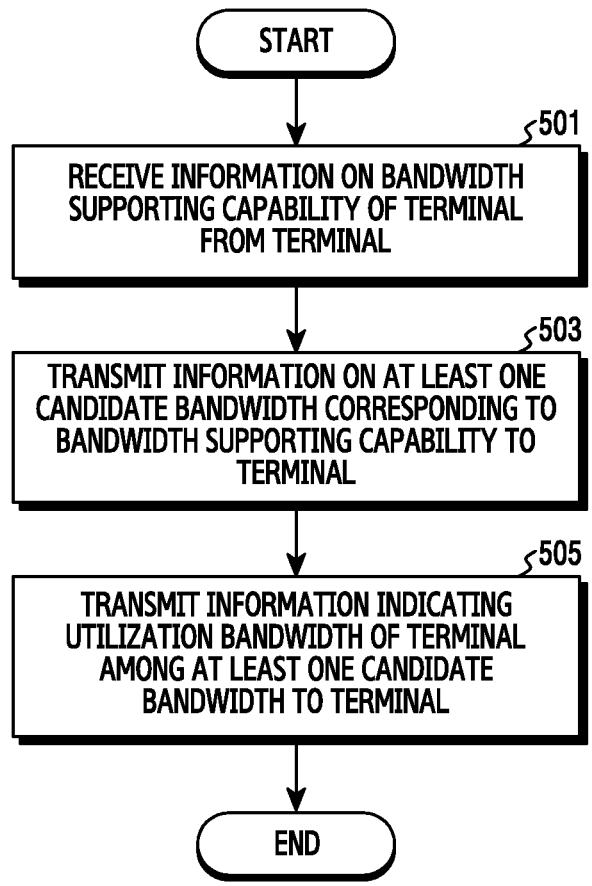
FIG. 5 is a flowchart illustrating the operation of the BS for bandwidth adaptation in a wireless communication system according to various embodiments of the present disclosure.
Figure 6:
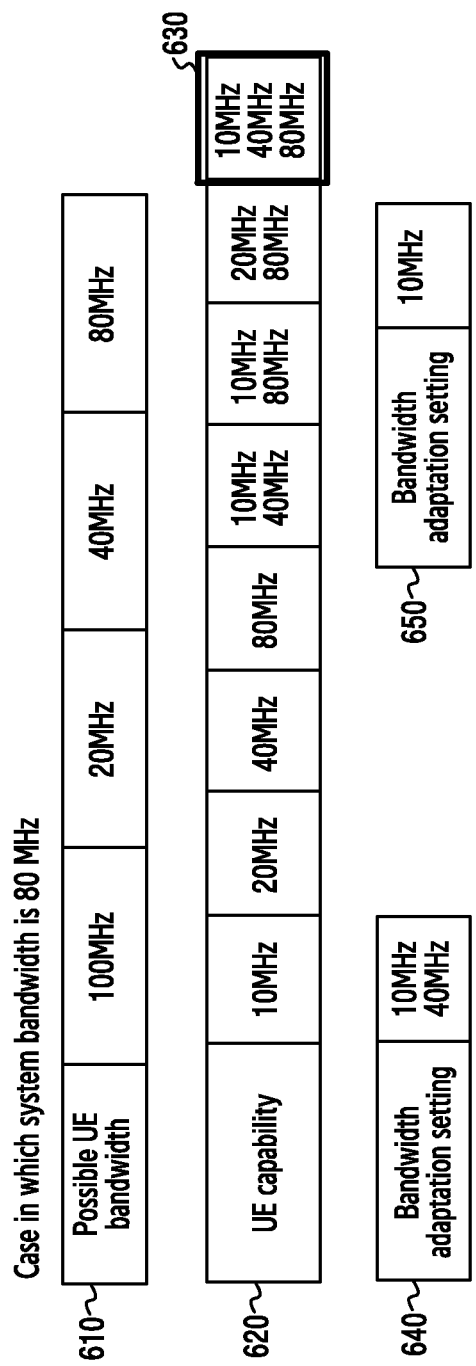
FIG. 6 illustrates bandwidths which can be considered for bandwidth adaptation in a wireless communication system according to various embodiments of the present disclosure.
Figure 7:
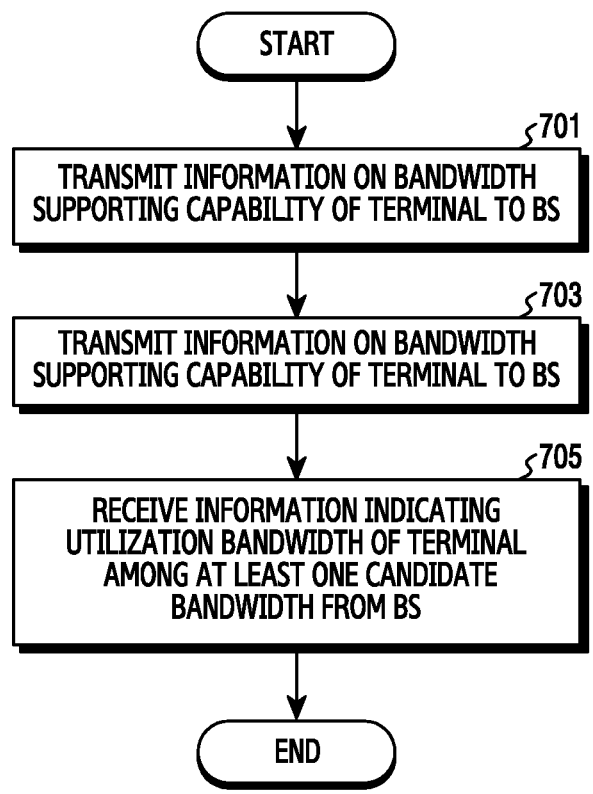
FIG. 7 is a flowchart illustrating the operation of the terminal in a wireless communication system according to various embodiments of the present disclosure.

Hereinafter, FIGS. 5 to 7 illustrate the operation of an individual BS (for example, the BS 110) and an individual terminal (for example, the terminal 120) for dual stage bandwidth adaptation.

FIG. 5 is a flowchart illustrating the operation of the BS for bandwidth adaptation in a wireless communication system according to various embodiments of the present disclosure. FIG. 5 illustrates an operation method of the BS 110.

Referring to FIG. 5, in step 501, the BS receives information on the bandwidth supporting capability of the terminal from the terminal. The bandwidth supporting capability may refer to the type and size of the supportable bandwidth of the terminal. For example, as illustrated in FIG. 6, when possible UE bandwidths 610 in the system bandwidth of 800 MHz are 10 MHz, 20 MHz, 40 MHz, and 80 MHz, information on the bandwidth supporting capability of the terminal (that is, UE capability 620) may include 10 MHz, 20 MHz, 40 MHz, 80 MHz, and a combination of 10 MHz and 40 MHz (that is, means that the terminal can support bandwidths of 10 MHz and 40 MHz), a combination of 10 MHz and 80 MHz (that is, means that the terminal can support bandwidths of 10 MHz and 80 MHz), a combination of 20 MHz and 80 MHz (that is, means that the terminal can support bandwidths of 20 MHz and 80 MHz), and a combination of 10 MHz, 20 MHz, and 80 MHz (that is, means that the terminal can support bandwidths of 10 MHz, 20 MHz, and 80 MHz) as the supportable bandwidths of the terminal. For convenience of description, it is assumed that the UE capability 620 received by the BS in step 501 includes a combination of 10 MHz, 20 MHz, and 80 MHz (hereinafter, referred to as a bandwidth combination 630) as the supportable bandwidths of the terminal.

In step 503, the BS transmits information on at least one candidate bandwidth corresponding to the bandwidth supporting capability to the terminal. According to various embodiments of the present disclosure, "information on at least one candidate bandwidth" may be referred to as "bandwidth adaptation setting". For example, as illustrated in FIG. 6, when the BS receives the UE capability 620 including the bandwidth combination 630, the BS may transmit the bandwidth adaptation setting 640 including a combination of 10 MHz and 40 MHz or the bandwidth adaptation setting 650 including a bandwidth of 10 MHz to the terminal as the candidate bandwidths in step 503.

In step 505, the BS transmits information indicating the utilization bandwidth of the terminal among at least one candidate bandwidth to the terminal. For example, as illustrated in FIG. 6, when the BS transmits the bandwidth adaptation setting 640 to the terminal, the BS may transmit information indicating one of 10 MHz and 40 MHz to the terminal as the utilization bandwidth. In another example, when the BS transmits the bandwidth adaptation setting 650, the BS may transmit information indicating 10 MHz to the terminal as the utilization bandwidth.

Although not illustrated, in order to transmit information on at least one candidate bandwidth corresponding to the bandwidth supporting capability of the terminal to the terminal in step 503, the BS may determine at least one candidate bandwidth based on the information on the bandwidth supporting capability of the terminal. Further, in order to transmit information indicating the utilization bandwidth of the terminal to the terminal among at least one candidate bandwidth in step 505, the BS may determine the utilization bandwidth of the terminal among at least one candidate bandwidth.

FIG. 7 is a flowchart illustrating the operation of the terminal in a wireless communication system according to various embodiments of the present disclosure. For example, FIG. 7 illustrates an operation method of the terminal 120.

Referring to FIG. 7, in step 701, the terminal transmits information on a bandwidth supporting capability of the terminal to the BS. The information on the bandwidth supporting capability of the terminal which the terminal transmits to the BS in step 701 is the same as the information on the bandwidth supporting capability of the terminal which the BS transmits to the terminal in step 501.

In step 703, the terminal receives information on at least one candidate bandwidth corresponding to the bandwidth supporting capability from the BS. The information on the candidate bandwidth which the terminal receives from the BS in step 703 is the same as the information on the candidate bandwidth which the BS transmits to the terminal in step 503.

In step 705, the terminal receives information indicating a utilization bandwidth of the terminal from the BS among at least one candidate bandwidth. The information which the terminal receives from the BS in step 705 is the same as the information which the BS receives from the terminal in step 505.

Figure 8:
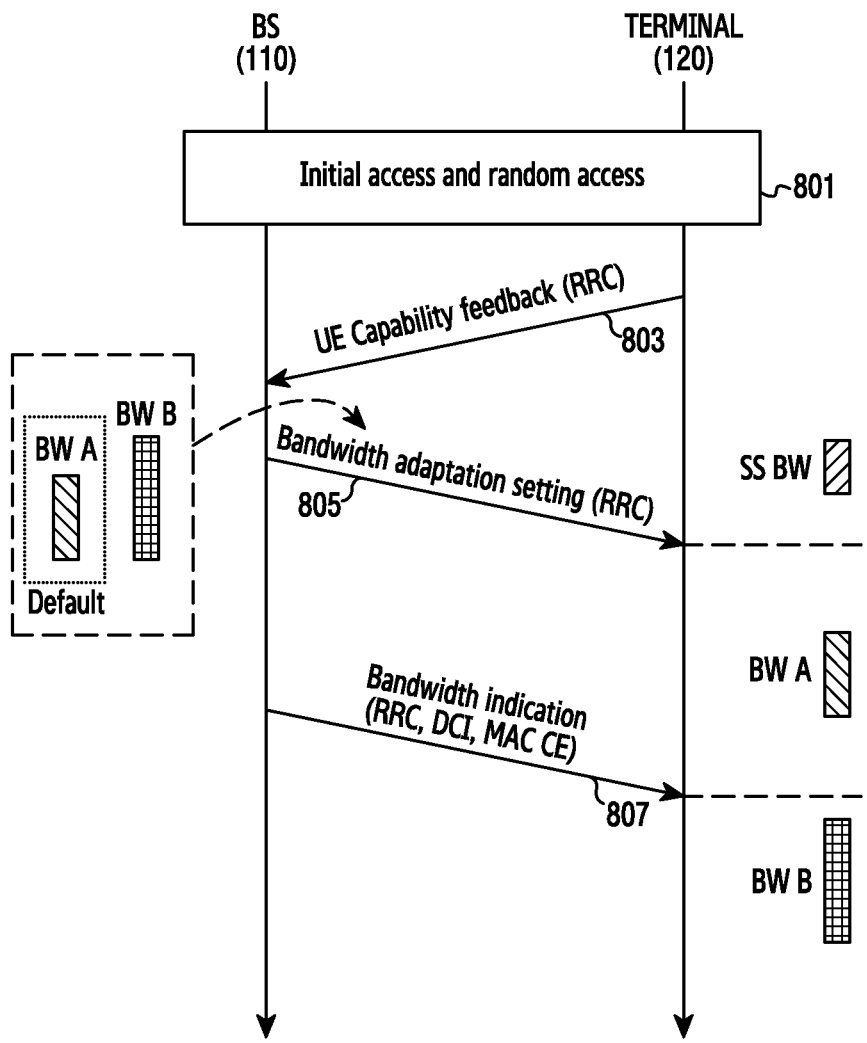
FIG. 8 illustrates an example of a signal flow for performing bandwidth adaptation based on bandwidth adaptation setting in a wireless communication system according to various embodiments of the present disclosure.
Figure 9:
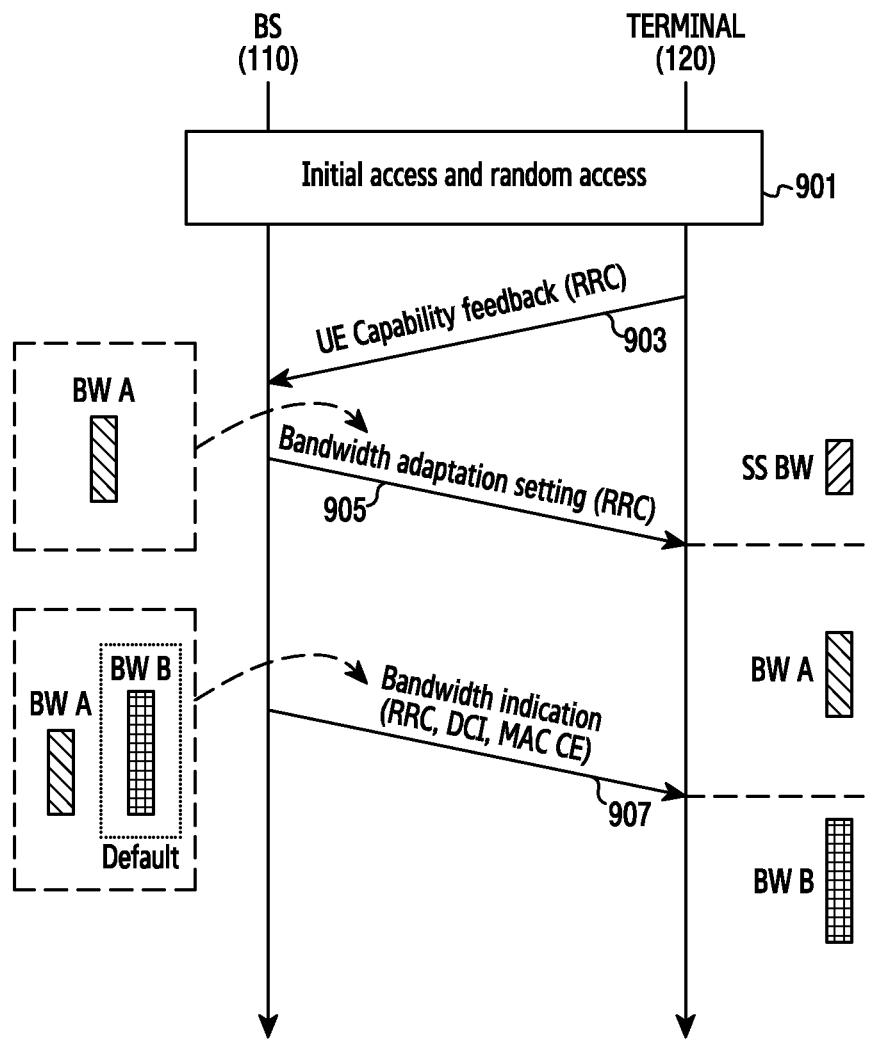
FIG. 9 illustrates another example of the signal flow for performing bandwidth adaptation based on bandwidth adaptation setting in a wireless communication system according to various embodiments of the present disclosure.

Hereinafter, FIGS. 8 to 9 illustrate examples of the operations of the BS and the terminal for dual stage bandwidth adaptation.

FIG. 8 illustrates an example of a signal flow for performing bandwidth adaptation based on bandwidth adaptation setting in a wireless communication system according to various embodiments of the present disclosure. FIG. 8 illustrates the operation of the BS 110 and the terminal 120.

Referring to FIG. 8, in step 801, the BS 110 and the terminal 120 perform initial access and/or random access. In the initial access and/or random access processes, the terminal may receive an MIB indicating a system bandwidth of the BS through a PBCH.

In step 803, the terminal 120 transmits a UE capability feedback to the BS 110 (or the BS receives a UE capability feedback from the terminal 120). The UE capability feedback may include information on the bandwidth supporting capability of the terminal 120 and may be transmitted or received through RRC.

In steps 801 and 803, the utilization bandwidth of the terminal 120 may be an SS bandwidth. In other words, the BS 110 may allocate downlink resources of the terminal 120 to the SS bandwidth before the terminal 120 receives an indication of the utilization bandwidth.

In step 805, the BS 110 transmits bandwidth adaptation setting to the terminal 120 (or the terminal 120 receives bandwidth adaptation setting from the BS 110). Referring to FIG. 8, the bandwidth adaptation setting may include information on a bandwidth A and a bandwidth B as candidate bandwidths, and the bandwidth A may be a default bandwidth. According to various embodiments of the present disclosure, the default bandwidth is a bandwidth functioning as the utilization bandwidth of the terminal 120 before the terminal 120 receives the bandwidth indication from the BS 110. Accordingly, as illustrated in FIG. 8, when the bandwidth A is configured as the default bandwidth in the bandwidth adaptation setting, the utilization bandwidth of the terminal 120 having received the bandwidth adaptation setting may switch from the SS bandwidth to the bandwidth A. The bandwidth adaptation setting may be transmitted or received through RRC.

In step 807, the BS 110 transmits the bandwidth indication to the terminal 120 (or the terminal 120 receives the bandwidth indication from the BS 110). The bandwidth indication may indicate the utilization bandwidth among candidate bandwidths indicated through the bandwidth adaptation setting. For example, as illustrated in FIG. 8, when the bandwidth adaptation setting includes information on the bandwidth A and the bandwidth B as the candidate bandwidths, the bandwidth indication may indicate transition of the utilization bandwidth of the terminal 120 to the bandwidth B. Accordingly, when the terminal 120 receives the bandwidth indication, the utilization bandwidth of the terminal 120 may be changed from the bandwidth A to the bandwidth B as illustrated in FIG. 8. The bandwidth indication may be transmitted or received through RRC, DCI, and/or MAC CE.

Although not illustrated, a transition time may be required to change the utilization bandwidth of the terminal 120. In this case, the utilization bandwidth of the terminal 120 may be changed when the transition time passes after the bandwidth indication is received.

In FIG. 8, the bandwidth adaptation setting includes information on two candidate bandwidths but this is only an example, and the bandwidth adaptation setting may include information on a predetermined number (plural or singular) bandwidth(s). For example, the bandwidth adaptation setting may include information on one candidate bandwidth as illustrated in FIG. 9.

FIG. 9 illustrates another example of the signal flow for performing bandwidth adaptation based on bandwidth adaptation setting in a wireless communication system according to various embodiments of the present disclosure. FIG. 9 illustrates the operation of the BS 110 and the terminal 120. In FIG. 9, steps 901 and 903 are the same as steps 801 and 803 of FIG. 8, respectively.

Referring to FIG. 9, in step 905, the BS 110 transmits bandwidth adaptation setting to the terminal 120 (or the terminal 120 receives bandwidth adaptation setting from the BS 110). Referring to FIG. 9, the bandwidth adaptation setting may include information on a bandwidth A as a candidate bandwidth. In other words, the bandwidth adaptation setting may not include information on a plurality of candidate bandwidths but may include information on a single candidate bandwidth. For example, when dynamic bandwidth adaptation through MAC CE or DCI is not required according to whether power is sufficient and/or according to an amount of traffic which the terminal 120 should transmit and receive, the bandwidth adaptation setting may include information on one candidate bandwidth. When the terminal 120 receives bandwidth adaptation setting including information on one candidate bandwidth (bandwidth A in FIG. 9) from the BS 110, the terminal 120 may not be required to identify the bandwidth indication before receiving a new bandwidth adaptation setting through RRC and the utilization bandwidth of the terminal 120 may transition from the SS bandwidth to the bandwidth A. The bandwidth adaptation setting may be transmitted or received through RRC.

In step 907, the BS 110 transmits bandwidth adaptation setting to the terminal 120 (or the terminal 120 receives bandwidth adaptation setting from the BS 110). Referring to FIG. 9, the bandwidth adaptation setting may include information the bandwidth A and the bandwidth B as candidate bandwidths, and the bandwidth B may be a default bandwidth. Accordingly, in step 907, the utilization bandwidth of the terminal 120 having received the bandwidth adaptation setting in step 907 may transition from the bandwidth A to the bandwidth B. The bandwidth adaptation setting may be transmitted or received through RRC.

Although not illustrated, a transition time may be required to change the utilization bandwidth of the terminal 120. In this case, the utilization bandwidth of the terminal 120 may be changed when the transition time passes after the bandwidth indication is received.

Hereinafter, the configuration of the UE capability feedback will be described.

Since the maximum supportable bandwidth of the terminal and the supportable bandwidth of the terminal vary depending on the number of radio frequency (RF) chains of the terminal, an antenna, or a filter, if the BS allocates bandwidths to the terminal without reception of the UE capability feedback from the terminal, the terminal may not use the allocated bandwidth. Accordingly, the BS should receive the UE capability feedback including information on the bandwidth supporting capability of the terminal from the terminal.

Figure 10:
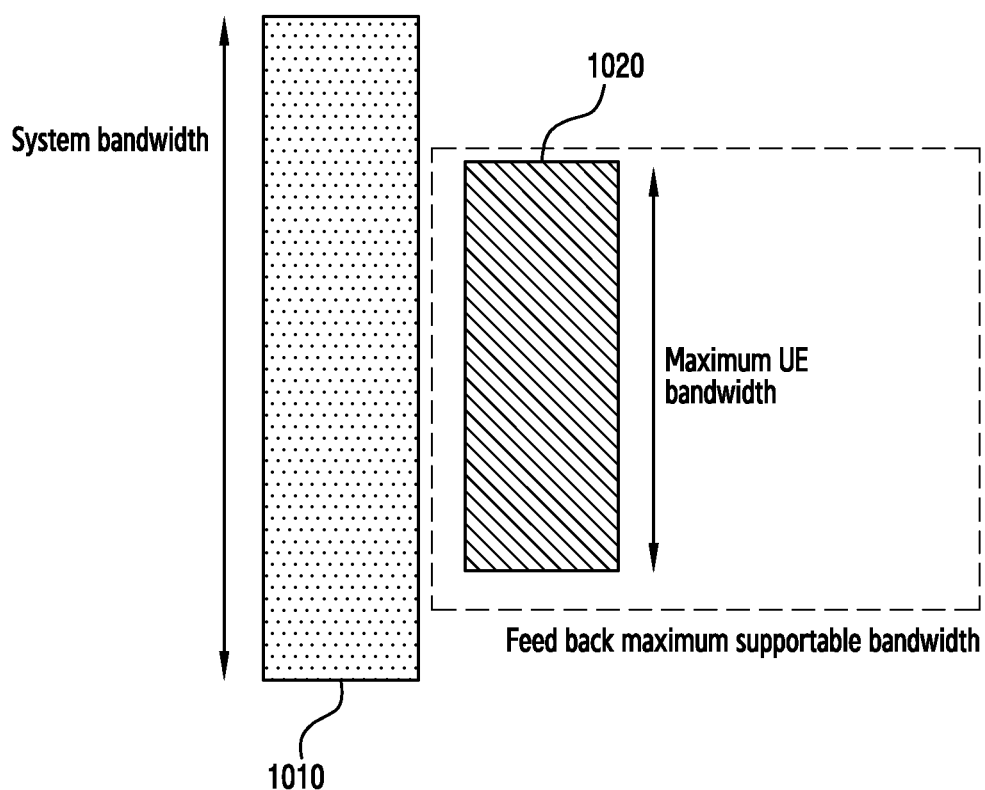
FIG. 10 illustrates an example of the case in which the terminal feeds back a maximum supportable bandwidth in a wireless communication system according to various embodiments of the present disclosure.

According to various embodiments of the present disclosure, the UE capability feedback (or information on the bandwidth supporting capability) may include information on the maximum supportable bandwidth (for example, a maximum UE bandwidth 1020) of the terminal as illustrated in FIG. 10. The maximum supportable bandwidth of the terminal is the widest bandwidth among bandwidths which the terminal can support. When the BS receives the UE capability feedback including information on the maximum supportable bandwidth of the terminal from the terminal, the BS may indicate a bandwidth narrower than the maximum supportable bandwidth of the terminal to the terminal as the utilization bandwidth. For example, as described above, the method of indicating the utilization bandwidth of the terminal based on the information on the maximum supportable bandwidth of the terminal may be used in the case in which there is a list of supportable bandwidths arranged in advance between the terminal and the BS and the terminal can support a bandwidth equal to or narrower than the maximum supportable bandwidth of the terminal. Although FIG. 10 illustrates that a maximum UE bandwidth 1020 is narrower than a system bandwidth 1010 of the BS, this is only an example and the maximum UE bandwidth 1020 may be the same as the system bandwidth 1010.

Figure 11:
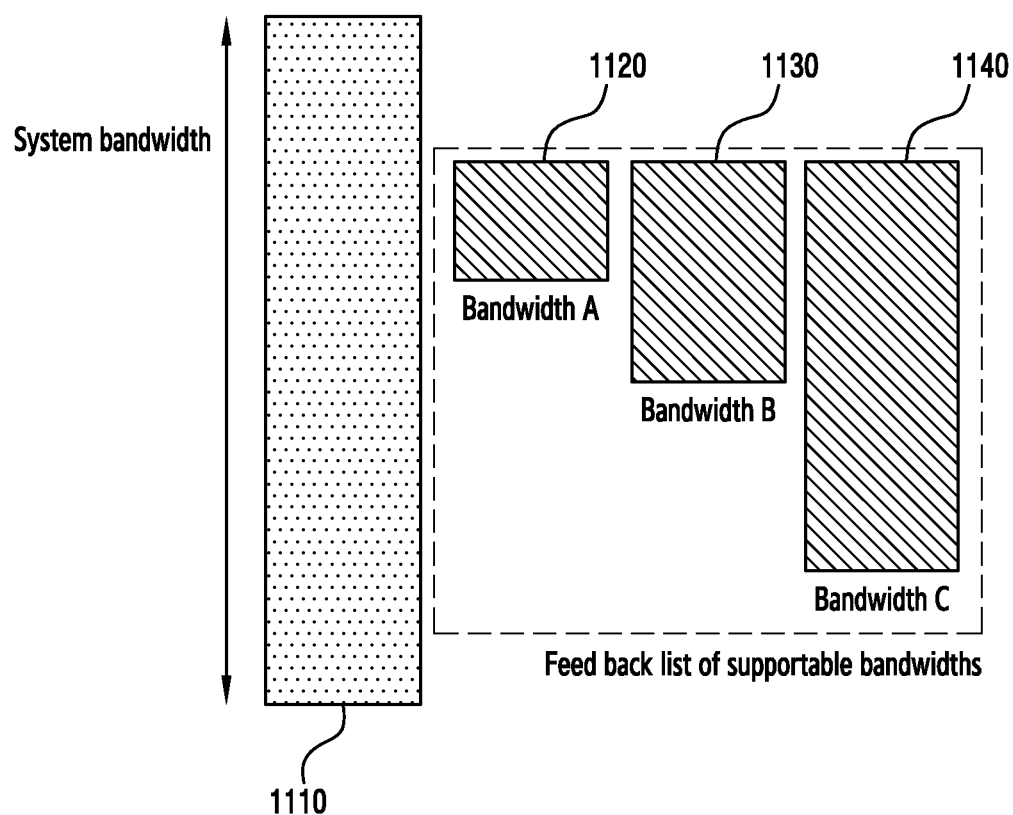
FIG. 11 illustrates an example of the case in which the terminal feeds back a list of supportable bandwidths in a wireless communication system according to various embodiments of the present disclosure.

According to various embodiments of the present disclosure, the UE capability feedback (or information on the bandwidth supportable capability) may include information on a list of supportable bandwidths of the terminal (for example, a bandwidth A 1120, a bandwidth B 1130, and a bandwidth C 1140) as illustrated in FIG. 11. In this case, the BS may determine a utilization bandwidth of the UE from the list of the supportable bandwidths of the terminal and indicate the determined utilization bandwidth to the terminal. For example, as described above, the method of indicating the utilization bandwidth of the terminal based on information on the list of supportable bandwidths of the terminal may be used in the case in which bandwidths which the terminal can use are limited due to a complexity issue of the terminal. Although FIG. 11 illustrates that the list of the supportable bandwidths of the terminal includes the bandwidth A 1120, the bandwidth B 1130, and the bandwidth C 1140, this is only an example and the number of bandwidths which can be included in the list of the supportable bandwidths is not limited. Further, at least one bandwidth included in the list of the supportable bandwidths of the terminal may be equal to or narrower than the system bandwidth 1110.

Figure 12:
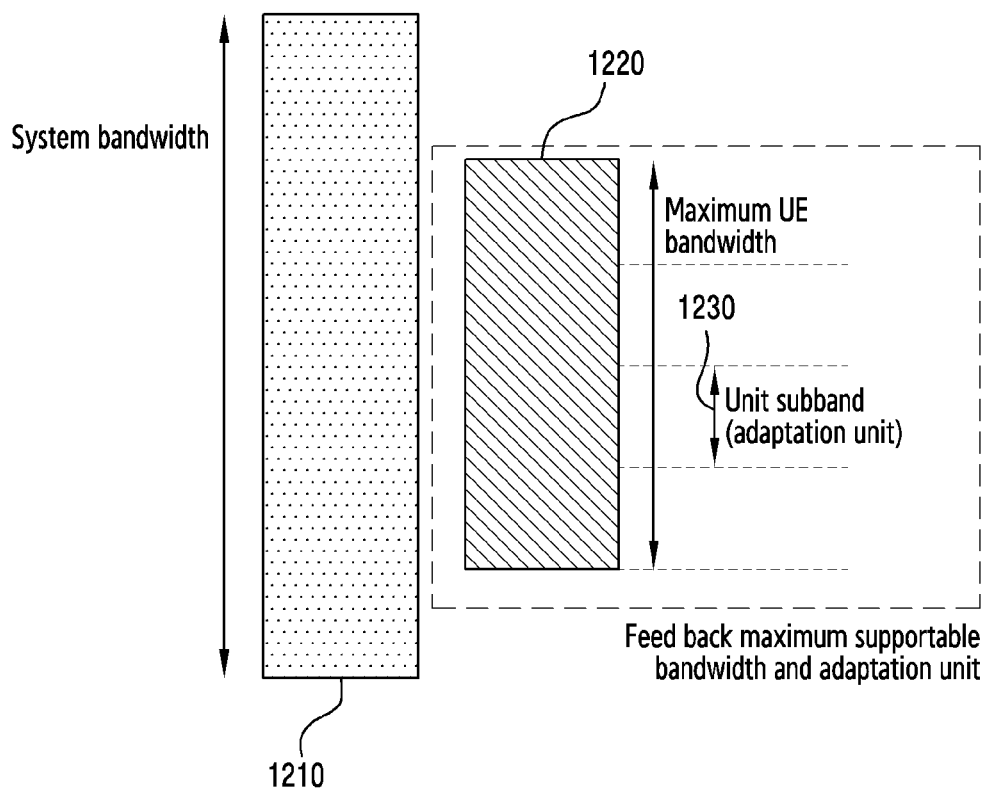
FIG. 12 illustrates an example of the case in which the terminal feeds back a maximum supportable bandwidth and a supportable unit bandwidth in a wireless communication system according to various embodiments of the present disclosure.

According to various embodiments of the present disclosure, the UE capability feedback (or information on the bandwidth supporting capability) may include the maximum supportable bandwidth of the terminal (for example, a maximum UE bandwidth 1220) and a supportable unit bandwidth of the terminal (for example, an adaptation unit (granularity) 1230) as illustrated in FIG. 12. The "supportable unit bandwidth of the terminal" is a bandwidth which is a basis of the supportable bandwidth of the terminal. For example, the supportable bandwidth of the terminal may be determined as a combination of the supportable unit bandwidth of the terminal and a predetermined mathematical rule such as (the supportable unit bandwidth of the terminal)×n or (the supportable unit bandwidth of the terminal)×an. Here, a and n are integers. In this case, the BS may determine a supportable bandwidth of the terminal based on the supportable unit bandwidth of the terminal within the range of the maximum supportable bandwidth of the terminal, and determine and indicate a utilization bandwidth of the terminal based on the determined supportable bandwidth. For example, as described above, the method of indicating the utilization bandwidth of the terminal based on information on the maximum supportable bandwidth of the terminal and the supportable unit bandwidth of the terminal may be used in the case in which bandwidths which the terminal can use are limited due to a complexity problem of the terminal. It works to the terminal's advantage to directly transmit a list of supportable bandwidths of the terminal to the BS through the UE capability feedback when the number of supportable bandwidths of the terminal is not large and the supportable unit bandwidth of the terminal cannot be defined, but it may be inefficient that the terminal feeds back all supportable bandwidths of the terminal to the BS when the supportable unit bandwidth of the terminal is defined. Accordingly, the terminal may transmit the UE capability feedback including information on the maximum supportable bandwidth of the terminal and the supportable unit bandwidth of the terminal to the BS, thereby reducing overhead of the UE capability feedback.

Figure 13:
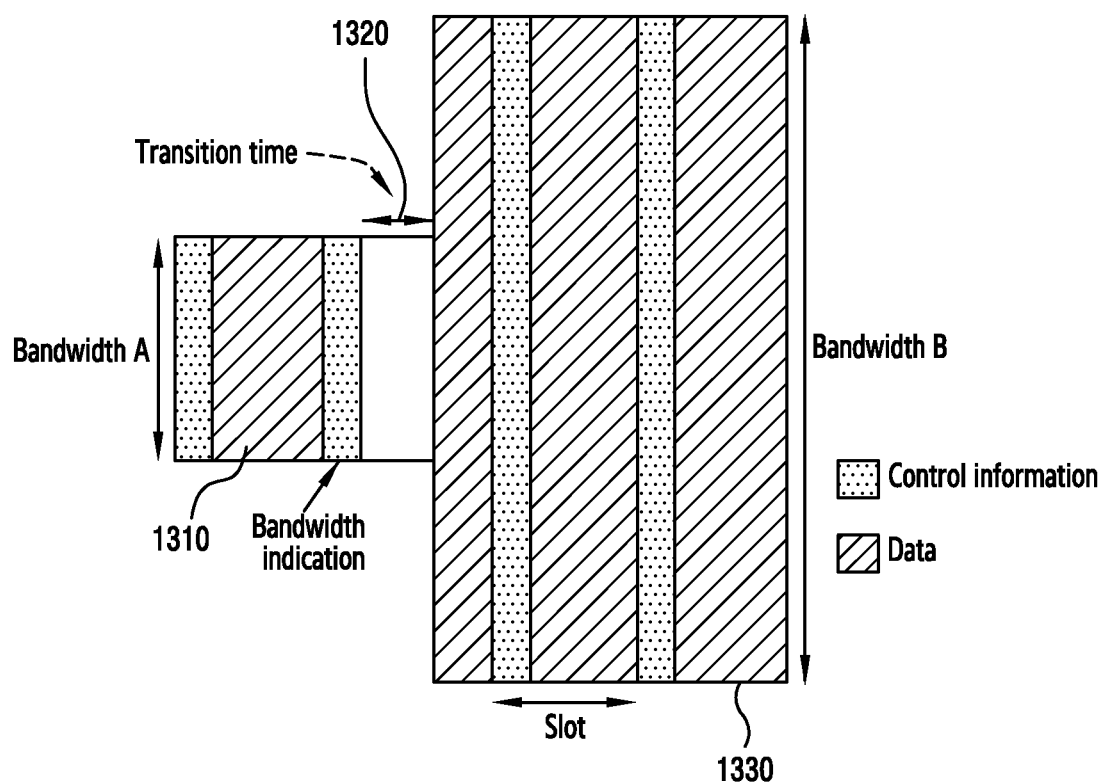
FIG. 13 illustrates an example of the case in which a transition time is considered for bandwidth adaptation in a wireless communication system according to various embodiments of the present disclosure.

According to various embodiments of the present disclosure, the UE capability feedback (or information on the bandwidth supporting capability) may include information on a transition time of the utilization bandwidth. For example, as illustrated in FIG. 13, when the terminal receiving information (for example, data and/or control information) from the BS through a bandwidth A 1310 receives a bandwidth indication indicating transition of the utilization bandwidth to a bandwidth B 1330 from the BS, the utilization bandwidth of the terminal is not immediately changed to the bandwidth B 1330 but is changed when a transition time 1320 passes after the bandwidth indication is received, and the terminal may receive information (for example, data and/or control information) from the BS through the bandwidth B 1330 since the transition time 1320 passes. In order to prevent allocation of resources to the terminal during the transition time, the BS is required to know a time point at which the terminal can actually use the transitioned bandwidth after receiving the bandwidth indication. Accordingly, the terminal may provide UE capability feedback including information on the transition time of the utilization bandwidth to the BS. The transition time of the utilization bandwidth may vary depending on whether a central frequency is changed during the transition process of the utilization bandwidth. Accordingly, the terminal may determine the transition time in consideration of the central frequency of the bandwidth and provide UE capability feedback including information on the transition time to the BS.

According to various embodiments of the present disclosure, the UE capability feedback (or information on the bandwidth supporting capability) may include information on a default bandwidth. When the terminal provides information on the default bandwidth to the BS through the UE capability feedback, the BS may allocate resources to the terminal in the default bandwidth wider than the SS bandwidth.

Hereinafter, the configuration of bandwidth adaptation setting will be described.

According to various embodiments of the present disclosure, bandwidth adaptation setting (or information on at least one candidate bandwidth corresponding to the bandwidth supporting capability of the terminal) may include al list of at least one candidate bandwidth. For example, the bandwidth adaptation setting may include the list of at least one candidate bandwidth, but may not include information on a central frequency of each of the at least one candidate bandwidth. In this case, the information on the central frequency of each of the at least one candidate bandwidth may be indicated to the terminal through a bandwidth indication.

Figure 14:
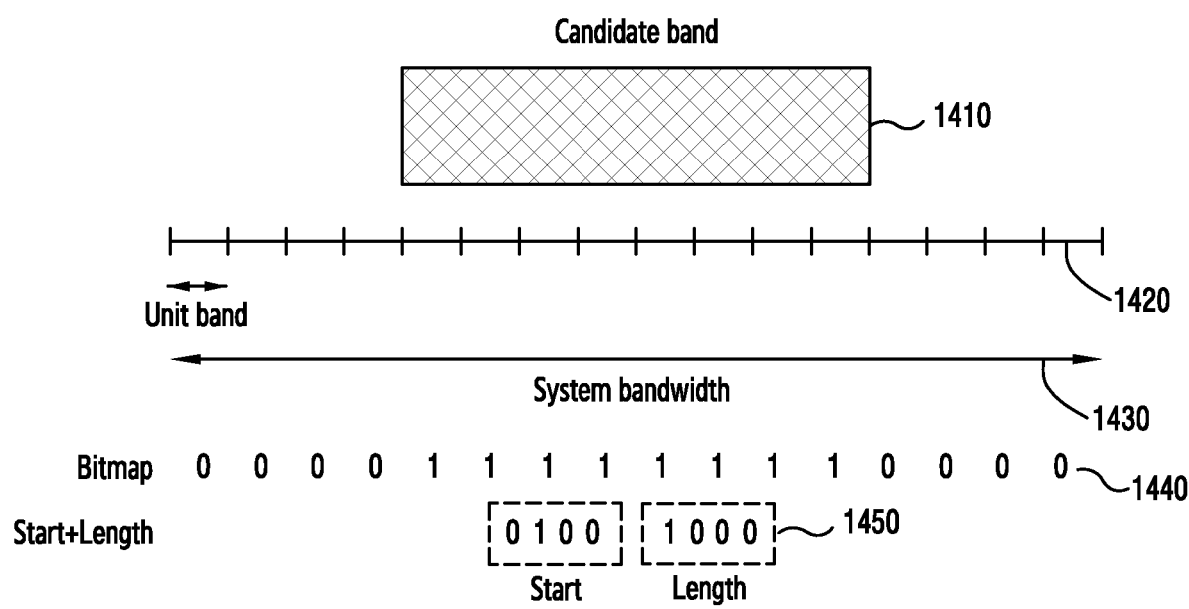
FIG. 14 illustrates an example of the case in which a candidate bandwidth is indicated using a bit value in a wireless communication system according to various embodiments of the present disclosure.

According to various embodiments of the present disclosure, the bandwidth adaptation setting (or information on at least one candidate bandwidth corresponding to the bandwidth supporting capability of the terminal) may include a list of at least one candidate bandwidth and information on the central frequency of each of the at least one candidate bandwidth. For example, as illustrated in FIG. 14, the bandwidth adaptation setting may include a bitmap 1440 and/or a bitmap 1450 indicating a list of at least one candidate bandwidth and a central frequency of each of the at least one candidate bandwidth. Referring to FIG. 14, a system bandwidth 1430 consists of a plurality of unit bands 1420 and each bit of the bitmap 1440 may correspond to each of a plurality of unit bands 1420. Each of the plurality of unit bands 1420 may consist of a predetermined number of resource blocks (RBs). When a candidate bandwidth 1410 corresponds to some (or all) of successive unit bands in the plurality of unit bands 1420, bits corresponding to successive unit bands in the bitmap 1440 may be configured as particular values (for example, 1). Accordingly, the terminal receiving the bandwidth adaptation setting including the bitmap 1440 may check bit values in the bitmap 1440 and identify a candidate bandwidth and a central frequency of the candidate bandwidth. The bitmap 1450 may include bit values (for example, 0100) indicating a start unit band in the successive unit bands corresponding to the candidate bandwidth 1410 and bit values (for example, 1000) indicating a number of successive unit bands next to the start unit band. The start unit band may be defined as a band having the lowest or highest central frequency among the successive unit bands. The terminal receiving the bandwidth adaptation setting including the bitmap 1450 may also check bit values in the bitmap 1450 and identify a candidate bandwidth and a central frequency of the candidate bandwidth.

According to various embodiments of the present disclosure, the bandwidth adaptation setting (or information on at least one candidate bandwidth corresponding to the bandwidth supporting capability of the terminal) may include a list of at least one candidate bandwidth and information on the central frequency of each of the at least one candidate bandwidth. The bandwidth adaptation setting may include an index of each of at least one candidate bandwidth and information on central frequencies differently configured for the same candidate bandwidth.

According to various embodiments of the present disclosure, the bandwidth adaptation setting (or information on at least one candidate bandwidth corresponding to the bandwidth supporting capability of the terminal) may include information on a maximum candidate bandwidth and a candidate unit bandwidth. The "maximum candidate bandwidth" is the widest bandwidth among candidate bandwidths, and the "candidate unit bandwidth" is a bandwidth which is a basis of the candidate bandwidth. For example, the candidate bandwidth may be determined as a combination of the candidate unit bandwidth and a predetermined mathematical rule such as (candidate unit bandwidth)×n or (candidate unit bandwidth)×an. Here, a and n are integers. According to various embodiments of the present disclosure, the candidate unit bandwidth may be the same as the supportable unit bandwidth of the terminal. The BS may provide information on the maximum candidate bandwidth and the candidate unit bandwidth to the terminal through the bandwidth adaptation setting and indicate a utilization bandwidth to the terminal through a bandwidth indication. In this case, the utilization bandwidth may be determined based on a combination of candidate unit bandwidths indicated through the bandwidth indication within a range of the maximum candidate bandwidth. For example, the combination of candidate unit bandwidths may be expressed by a bitmap.

Hereinafter, the configuration of the bandwidth indication will be described.

According to various embodiments of the present disclosure, the bandwidth indication (or information indicating the utilization bandwidth of the terminal) may include an indicator for triggering transition of the utilization bandwidth. For example, when the BS provides information on two candidate bandwidths to the terminal through bandwidth adaptation setting, the BS may indicate, to the terminal, a change of the utilization bandwidth from one bandwidth to the other bandwidth among the two bandwidths through the bandwidth indication.

According to various embodiments of the present disclosure, the bandwidth indication (or information indicating the utilization bandwidth of the terminal) may include an index corresponding to one of the candidate bandwidths indicated through the bandwidth adaptation setting. The terminal receiving the index may change the utilization bandwidth to a bandwidth corresponding to the index. A method of providing the bandwidth indication based on the index may be used even when three or more candidate bandwidths are indicated to the terminal through the bandwidth setting.

According to various embodiments of the present disclosure, the bandwidth indication (or information indicating the utilization bandwidth of the terminal) may include information on the number of candidate unit bandwidths. For example, when the BS provides information on the candidate unit bandwidth to the terminal through the bandwidth adaptation setting, the BS may indicate the utilization bandwidth to the terminal by providing information on the number of candidate unit bandwidths to the terminal. The utilization bandwidth of the terminal may be determined based on the number of candidate unit bandwidths.

According to various embodiments of the present disclosure, the bandwidth indication (or information indicating the utilization bandwidth of the terminal) may include a bitmap for indicating the utilization bandwidth. For example, when the BS provides information on the candidate unit bandwidth to the terminal through the bandwidth adaptation setting, the BS may indicate the utilization bandwidth to the terminal by providing a bitmap indicating a combination of candidate unit bandwidths included in the utilization bandwidth to the terminal. Since the BS indicates a system bandwidth of the BS to the terminal through an MIB and indicates information on candidate unit bandwidths to the terminal through RRC, a resource map determined based on the system bandwidth and the candidate unit bandwidth may be shared between the BS and the terminal. The resource map may indicate a corresponding relationship between the system bandwidth and candidate unit bandwidths. The BS may determine a bitmap indicating a location (that is, the central frequency) and size of the utilization bandwidth through the resource map and indicate the utilization bandwidth to the terminal by transmitting a bandwidth indication including the bitmap to the terminal.

According to various embodiments of the present disclosure, the bandwidth indication (or information indicating the utilization bandwidth of the terminal) may include information on a start candidate unit bandwidth among successive candidate unit bandwidths included in the utilization bandwidth and the number of successive candidate unit bandwidths next to the start candidate unit bandwidth. The BS may indicate the location (that is, the central frequency) and size of the utilization bandwidth to the terminal by transmitting the bandwidth indication to the terminal.

According to various embodiments of the present disclosure, the bandwidth indication may include information related to the central frequency of the utilization bandwidth. In this case, the bandwidth adaptation setting may not include information on the central frequency of the candidate bandwidth. For example, when a frequent change in the central frequency of the utilization bandwidth of the terminal is required, the bandwidth indication including the information on the central frequency of the utilization bandwidth may be provided to the terminal through MAC CE or DCI. Further, although the bandwidth indication includes the information on the central frequency of the utilization bandwidth, the bandwidth adaptation setting may also include the information on the central frequency of the candidate bandwidth.

Hereinafter, a transmission scheme (or an indication scheme of the utilization bandwidth) of the bandwidth indication will be described.

According to various embodiments of the present disclosure, the bandwidth indication may be transmitted through MAC CE.

According to various embodiments of the present disclosure, the bandwidth indication may be transmitted through DCI. For example, when it is required to relatively flexibly and rapidly perform a change in the utilization bandwidth of the terminal, the bandwidth indication may be transmitted through DCI.

According to various embodiments of the present disclosure, in the bandwidth indication, detailed information on the utilization bandwidth may be transmitted to the terminal through MAC CE and triggering information of a time point at which a change to the indicated utilization bandwidth is made may be transmitted to the terminal through DCI. For example, the detailed information on the utilization bandwidth may include information on the configuration (numerology) of the utilization bandwidth (for example, a subcarrier interval of the utilization bandwidth) and the central frequency of the utilization bandwidth. When an amount of information included in the bandwidth indication is large, provision of all pieces of information on the bandwidth indication to the terminal may cause overhead. Accordingly, the BS may transmit detailed information on the utilization bandwidth to the terminal through MAC CE and information of triggering transition to the indicated utilization bandwidth to the terminal through DCI.

According to various embodiments of the present disclosure, the bandwidth indication may be transmitted through RRC. For example, when it is not required to flexibly perform the change in the utilization bandwidth of the terminal, the bandwidth indication may be transmitted through RRC.

Hereinafter, a format of DCI for transmitting the bandwidth indication will be described.

According to various embodiments of the present disclosure, the format of DCI may vary depending on the bandwidth adaptation setting. In other words, information to be included in the bandwidth indication may be determined according to the bandwidth adaptation setting transmitted through RRC, and the format of DCI may vary depending on the information to be included in the bandwidth indication. For example, when the bandwidth adaptation setting transmitted to the terminal through RRC includes information on one candidate bandwidth, it may not be required to transmit a bandwidth indication for separately indicating the utilization bandwidth through DCI. Accordingly, the format of DCI may be differently configured in cases in which the DCI includes the bandwidth indication and does not include the bandwidth indication according to the bandwidth adaptation setting. Through the use of different formats of DCI, the BS may not transmit the bandwidth indication to the terminal in a situation in which transmission of the bandwidth indication is not needed.

According to various embodiments of the present disclosure, a reserved bit for the bandwidth indication may be used in DCI. For example, when the bandwidth indication corresponds to a small number of bits (1 or 2 bits) including only information of triggering transition to a particular utilization bandwidth or index information of the utilization bandwidth, using a different DCI format may be inefficient in the light of complexity of the terminal according to whether DCI includes the bandwidth indication in order to reduce overhead. Accordingly, when it is required to transmit the bandwidth indication using the same DCI format including the reserved bit regardless of whether the DCI includes the bandwidth indication, the BS may transmit the bandwidth indication through the reserved bit of the DCI.

As described above, the BS may indicate the utilization bandwidth to the terminal according to dual stage bandwidth adaptation. However, when supportable bandwidths of the terminal are limited (that is, the number of supportable bandwidths of the terminal is small), the BS is not required to separately provide bandwidth adaptation setting to the terminal, so that the BS may use a single state bandwidth adaptation scheme rather than the dual stage bandwidth adaptation scheme in order to indicate the utilization bandwidth to the terminal. The single stage bandwidth adaptation scheme will be described in more detail with reference to FIG. 15.

Figure 15:
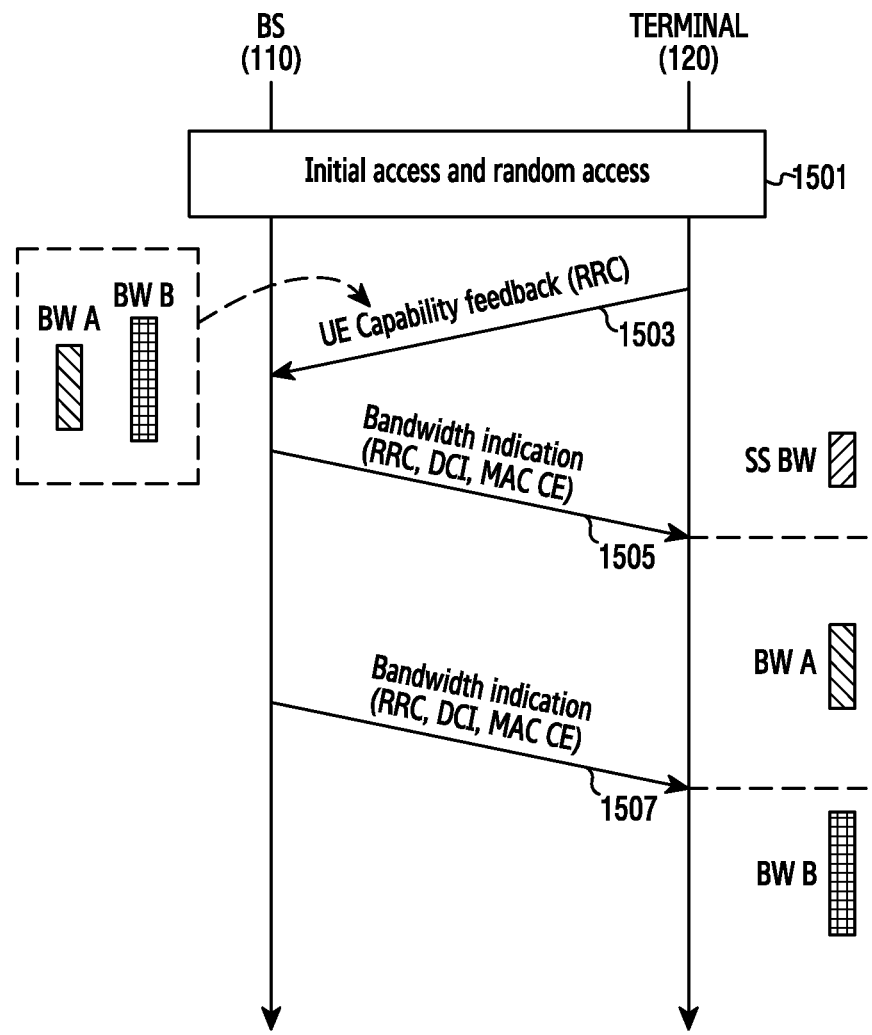
FIG. 15 illustrates a signal flow for performing bandwidth adaptation without transmission of bandwidth adaptation setting by the BS in a wireless communication system according to various embodiments of the present disclosure.

FIG. 15 illustrates a signal flow for performing bandwidth adaptation without transmission of bandwidth adaptation setting by the BS in a wireless communication system according to various embodiments of the present disclosure. FIG. 15 illustrates the operation of the BS 110 and the terminal 120. In FIG. 15, step 1601 is the same as step 801 of FIG. 8.

Referring to FIG. 15, in step 1503, the terminal 120 transmits a UE capability feedback to the BS 110 (or the BS 110 receives a UE capability feedback from the terminal 120). As illustrated in FIG. 15, the UE capability feedback may include information on a bandwidth A and a bandwidth B which are supportable bandwidths of the terminal 120. In step 1503, the UE capability feedback may be transmitted through RRC. Further, in steps 1501 and 1503, a utilization bandwidth of the terminal 120 may be an SS bandwidth.

In step 1505, the BS 110 transmits a bandwidth indication to the terminal 120 (or the terminal 120 receives a bandwidth indication from the BS 110). In other words, the BS 110 may transmit a bandwidth indication indicating the utilization bandwidth among the supportable bandwidths of the terminal 120 to the terminal 120 without transmitting bandwidth adaptation setting to the terminal 120. For example, as illustrated in FIG. 15, the BS 110 may transmit a bandwidth indication indicating that the bandwidth A among the bandwidth A and the bandwidth B is the utilization bandwidth to the terminal 120. Accordingly, when the terminal 120 receives the bandwidth indication, the utilization bandwidth of the terminal 120 may be changed from the SS bandwidth to the bandwidth A as illustrated in FIG. 15. The bandwidth indication may be transmitted or received through RRC, DCI, and/or MAC CE.

In step 1507, the BS 110 transmits a bandwidth indication to the terminal 120 (or the terminal 120 receives a bandwidth indication from the BS 110). For example, as illustrated in FIG. 15, when the terminal 120 receives a bandwidth indication indicating that the bandwidth B is the utilization bandwidth from the BS 110, the utilization bandwidth of the terminal 120 may be changed from the bandwidth A to the bandwidth B. The bandwidth indication may be transmitted or received through RRC, DCI, and/or MAC CE.

Although not illustrated, a transition time may be required to change the utilization bandwidth of the terminal 120. In this case, the utilization bandwidth of the terminal 120 may be changed when the transition time passes after the bandwidth indication is received.

As illustrated in FIG. 15, according to various embodiments of the present disclosure, the bandwidth indication may be transmitted through RRC in single stage bandwidth adaptation. In this case, the bandwidth indication may include information on the utilization bandwidth of the terminal and a central frequency of the utilization bandwidth. The bandwidth indication in the single stage bandwidth adaptation may be the same as bandwidth adaptation setting including information on at least one candidate bandwidth in the dual stage bandwidth adaptation. In the single stage bandwidth adaptation, the bandwidth indication through RRC may be used when the utilization bandwidth of the terminal is not needed to be relatively flexibly and rapidly changed.

According to various embodiments of the present disclosure, in the single stage bandwidth adaptation, the bandwidth indication may be transmitted through MAC CE or DCI. In this case, the bandwidth indication may include information on the selected utilization bandwidth among the supportable bandwidths of the terminal, and the BS may transmit the bandwidth indication to the terminal without transmitting bandwidth adaptation setting to the terminal like in the dual stage bandwidth adaptation.

As described above, the terminal may receive an indication of the utilization bandwidth from the BS and perform communication using the indicated utilization bandwidth. However, the terminal may actively transmit a message making a request for the utilization bandwidth to the BS. That is, since one of the objectives to perform the bandwidth adaptation is to reduce power consumption of the terminal, the terminal may prefer a particular utilization bandwidth according to a power condition of the terminal (or a residual amount of battery). Accordingly, the terminal may transmit a message making a request for changing the utilization bandwidth to the preferred utilization bandwidth to the BS. For example, the utilization bandwidth for which the terminal makes a request to the BS may be determined among from candidate bandwidths received through the bandwidth adaptation setting.

Hereinafter, a method by which the terminal makes a request for the utilization bandwidth will be described with reference to FIG. 16.

Figure 16:
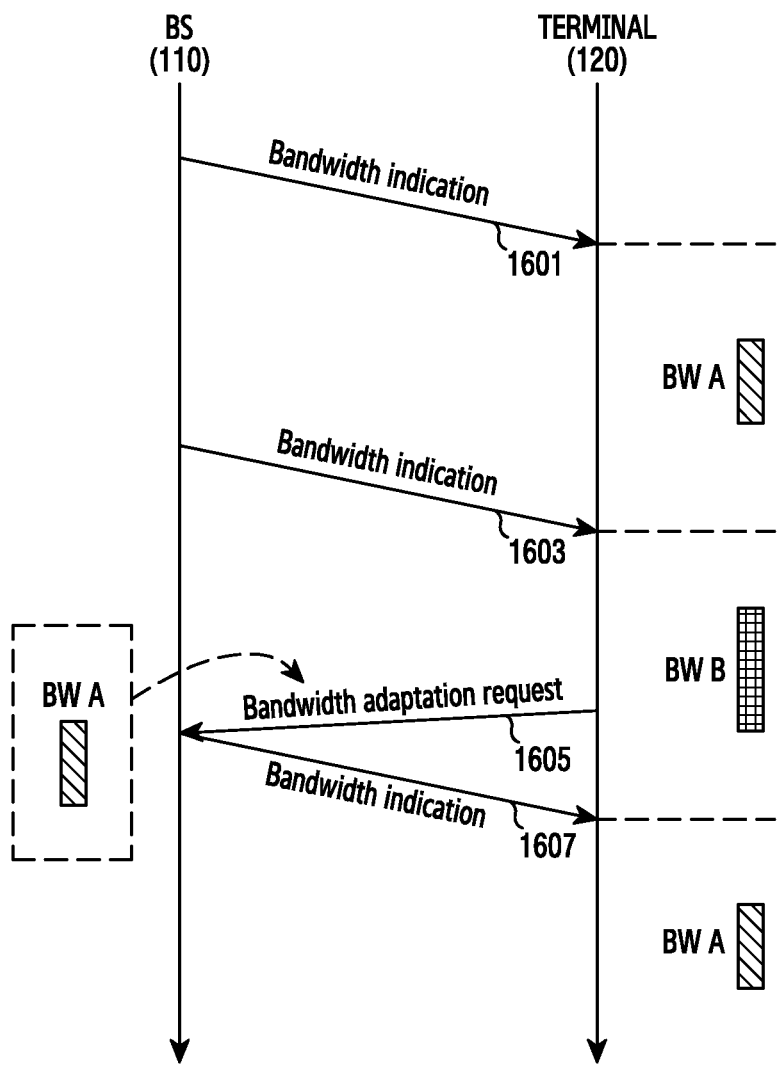
FIG. 16 illustrates a signal flow for a bandwidth adaptation request in a wireless communication system according to various embodiments of the present disclosure.

FIG. 16 illustrates a signal flow for a bandwidth adaptation request in a wireless communication system according to various embodiments of the present disclosure. FIG. 16 illustrates the operation of the BS 110 and the terminal 120. Although not illustrated, it is assumed that the BS 110 and the terminal 120 perform initial access and random access procedures and exchange a UE capability feedback and bandwidth adaptation setting (corresponding only to dual stage bandwidth adaptation) in FIG. 16.

Referring to FIG. 16, in step 1601, the BS 110 transmits a bandwidth indication to the terminal 120. For example, the BS 110 may transmit a bandwidth indication indicating that a bandwidth A is a utilization bandwidth to the terminal 120 and the utilization bandwidth of the terminal receiving the bandwidth indication may be changed to the bandwidth A. The bandwidth indication may be transmitted or received through RRC, DCI, and/or MAC CE.

In step 1603, the BS 110 transmits the bandwidth indication to the terminal 120. For example, the BS 110 may transmit a bandwidth indication indicating that a bandwidth B is the utilization bandwidth to the terminal 120 and the utilization bandwidth of the terminal receiving the bandwidth indication may be changed to the bandwidth B. The bandwidth B may be wider than the bandwidth A. The bandwidth indication may be transmitted or received through RRC, DCI, and/or MAC CE.

In step 1605, the terminal 120 transmits a message making a request for the utilization bandwidth (or a bandwidth adaptation request) to the BS 110. For example, the terminal 120 may transmit a message making a request for the bandwidth A as the utilization bandwidth to the BS 110. When a power condition of the terminal 120 is not good (that is, a residual amount of battery is low) or it is required to receive power consumption of the terminal 120, it works to the advantage of the terminal 120 to use the bandwidth A narrower than the bandwidth B. Accordingly, the terminal 120 may transmit a message making a request for the bandwidth B as the utilization bandwidth to the BS 110. The message making a request for the utilization message may be transmitted or received through RRC, DCI, and/or MAC CE.

Although not illustrated, the terminal 120 may generate a message making a request for the utilization bandwidth based on the residual amount of battery of the terminal 120 or whether it is required to reduce power consumption of the terminal 120 (for example, a heating amount of the terminal 120 or a type of processor executed in the terminal 120). Further, the message making the request for the utilization bandwidth may include information on a plurality of preferred bandwidths and a priority of the preferred bandwidths. When the BS 110 receives the request message including the information on the plurality of preferred bandwidths and the priority of the preferred bandwidths, the BS 110 may indicate that a bandwidth having the highest priority is the utilization bandwidth to the terminal 120. When the bandwidth having the highest priority is not available, the BS 110 may indicate that a bandwidth having the next priority is the utilization bandwidth to the terminal 120.

In step 1607, the BS 110 transmits the bandwidth indication to the terminal 120. For example, the BS 110 may transmit a bandwidth indication indicating that the bandwidth A is the utilization bandwidth to the terminal 120 in consideration that the bandwidth requested from the terminal 120 is the bandwidth A. The bandwidth indication may be transmitted or received through RRC, DCI, and/or MAC CE.

Although not illustrated, a transition time may be required to change the utilization bandwidth of the terminal 120. In this case, the utilization bandwidth of the terminal 120 may be changed when the transition time passes after the bandwidth indication is received.

According to various embodiments of the present disclosure, the terminal may communication with the BS through the utilization bandwidth indicated by the bandwidth indication received from the BS and allocate resources of the terminal to the utilization bandwidth. However, the terminal may not properly receive the bandwidth indication from the BS according to a channel condition. In this case, the terminal may not properly change the utilization bandwidth, so that the utilization bandwidth of the terminal may not match the bandwidth to which the BS allocates resources and thus the terminal may have a problem in receiving information from the BS. Accordingly, the terminal is required to report on whether the bandwidth indication is properly received from the BS to the BS.

Hereinafter, an example in which the terminal provides a report on reception of the bandwidth indication to the BS will be described with reference to FIG. 17.

Figure 17:
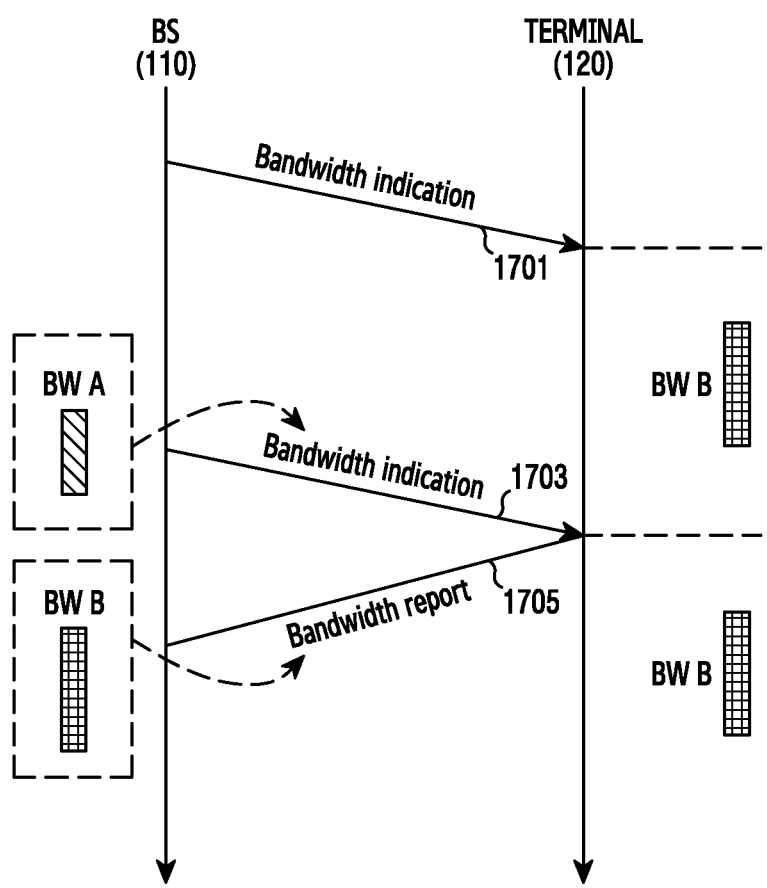
FIG. 17 illustrates a signal flow for a bandwidth report in a wireless communication system according to various embodiments of the present disclosure.

FIG. 17 illustrates a signal flow for a bandwidth report in a wireless communication system according to various embodiments of the present disclosure. FIG. 17 illustrates the operation of the BS 110 and the terminal 120. Although not illustrated, it is assumed that the BS 110 and the terminal 120 perform initial access and random access procedures and exchange a UE capability feedback and bandwidth adaptation setting (corresponding only to dual stage bandwidth adaptation) in FIG. 17.

Referring to FIG. 17, in step 1701, the BS 110 transmits a bandwidth indication to the terminal 120. For example, bandwidth indication may indicate a bandwidth B as a utilization bandwidth of the terminal 120. The utilization bandwidth of the terminal 120 may transition to the bandwidth B in response to reception of the bandwidth indication.

In step 1703, the BS 110 transmits the bandwidth indication to the terminal 120. For example, the bandwidth indication may indicate a bandwidth A as the utilization bandwidth of the terminal 120. The bandwidth A may be narrower than the bandwidth B.

In step 1705, the terminal 120 transmits a bandwidth report to the BS 110. The bandwidth report is a response message corresponding to the bandwidth indication (or information indicating the utilization bandwidth) and may indicate acknowledgement (ACK) or negative ACK (NACK) of the bandwidth indication by the terminal 120. Further, the bandwidth report may indicate that the terminal 120 rejects transition of the utilization bandwidth or that the terminal 120 maintains the current utilization bandwidth to the BS 110 although the terminal 120 receives the bandwidth indication indicating transition of the utilization bandwidth from the BS 110. In addition, the bandwidth report may include information on a bandwidth to be used among candidate bandwidths for which the terminal 120 receives an indication from the BS 110. Through the bandwidth report, the BS 110 can know whether the terminal 120 properly receives the bandwidth indication or changes the utilization bandwidth according to the indication through the bandwidth report, so that it is possible to prevent mismatching between bandwidths of the BS 110 and the terminal 120 due to an error of reception of the bandwidth indication. For example, the bandwidth report may include information on the bandwidth B, and the terminal 120 may maintain the bandwidth B as the utilization bandwidth of the terminal 120 although the terminal 120 receives the bandwidth indication indicating transition of the utilization bandwidth to the bandwidth from the BS 110. As described above, even though the terminal 120 uses the bandwidth (for example, the bandwidth B) wider than the bandwidth (for example, the bandwidth A) indicated by the BS 110, the terminal 120 may receive correct information from the BS 110. When the terminal 120 uses the bandwidth wider than the bandwidth indicated by the BS 110, the terminal 120 may inform the BS 110 of the use of the wider bandwidth through the bandwidth report and the BS 110 may perform a channel state information (CSI) process in the wider bandwidth. When the BS 110 performs the CSI process, the BS 110 may easily transmit a large amount of data to the terminal 120.

According to various embodiments of the present disclosure, the BS may indicate the utilization bandwidth to the terminal in order to allocate downlink resources. Further, the BS may indicate the utilization bandwidth to the terminal through uplink communication. In other words, since the system bandwidth of the BS can be wider than the bandwidth which the terminal actually uses in uplink communication, the BS may indicate the utilization bandwidth for uplink transmission of the terminal to the terminal.

Hereinafter, a bandwidth indication for uplink communication will be described with reference to FIG. 18.

Figure 18:
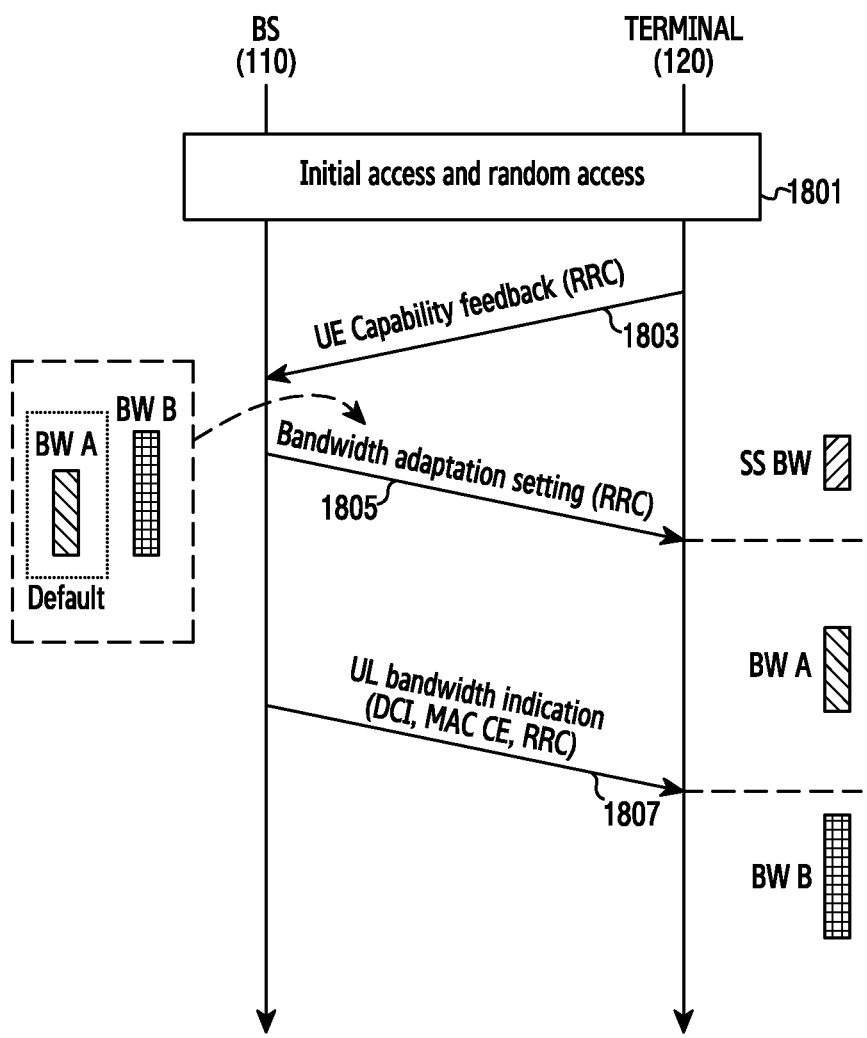
FIG. 18 illustrates a signal flow for uplink bandwidth adaptation in a wireless communication system according to various embodiments of the present disclosure.

FIG. 18 illustrates a signal flow for uplink bandwidth adaptation in a wireless communication system according to various embodiments of the present disclosure. FIG. 18 illustrates the operation of the BS 110 and the terminal 120.

In FIG. 18, steps 1801, 1803, 1805, and 1807 are the same as steps 801, 803, 805, and 807 in FIG. 8, respectively. The terminal 120 may transmit uplink information to the BS 110 through each SS bandwidth and bandwidths (for example, bandwidths A and B) indicated by the BS 110.

In FIG. 18, an indication of a utilization bandwidth for transmitting uplink information by the terminal 120 is performed according to dual stage bandwidth adaptation but this is only an example, and the indication of the utilization bandwidth for transmitting uplink information by the terminal 120 may be performed according to single stage bandwidth adaptation.

Methods according to embodiments stated in claims and/or specifications of the present disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the present disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described detailed embodiments of the present disclosure, a component included in the present disclosure is expressed in the singular or the plural according to a presented detailed embodiment. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

The invention claimed is:

1. A method performed by a base station (BS) in a wireless communication system, the method comprising:
   receiving, from a terminal, first capability information on a bandwidth supporting capability and second capability information associated with a bandwidth switching time;
   transmitting, to the terminal via a radio resource control (RRC) signaling, configuration information on at least one bandwidth; and
   transmitting, to the terminal, downlink control information (DCI) for indicating a utilization bandwidth for a bandwidth change among the at least one bandwidth,
   wherein the DCI comprises resource allocation indicating time resources after the bandwidth switching time from a time when the DCI is received.

2. The method of claim 1, wherein the first capability information on the bandwidth supporting capability includes maximum bandwidth supportable by the terminal.

3. The method of claim 1, wherein the configuration information includes information on a subcarrier spacing of each of the at least one bandwidth and information on a frequency location of each of the at least one bandwidth.

4. The method of claim 1, wherein the DCI includes an index corresponding to the utilization bandwidth, and
   wherein the DCI is transmitted according to a first DCI formation that is different from a second DCI formation including a field indicating a bandwidth to be changed.

5. The method of claim 1, further comprising receiving a message requesting for the bandwidth change from the terminal.

6. The method of claim 1, further comprising receiving a response message corresponding to the DCI from the terminal,
   wherein the response message indicates acknowledgement (ACK) or negative ACK (NACK).

7. A method performed by a terminal in a wireless communication system, the method comprising:
   transmitting, to a base station (BS), first capability information on a bandwidth supporting capability of and second capability information associated with a bandwidth switching time;
   receiving, from the BS, via a radio resource control (RRC) signaling, configuration information on at least one bandwidth;
   receiving, from the BS, downlink control information (DCI) for indicating a utilization bandwidth for a bandwidth change among the at least one bandwidth; and
   performing the bandwidth change to the utilization bandwidth,
   wherein the DCI comprises resource allocation indicating time resources after the bandwidth switching time from a time when the DCI is received.

8. The method of claim 7, wherein the first capability information on the bandwidth supporting capability includes maximum supported by the terminal.

9. The method of claim 7, wherein the configuration information includes information on a subcarrier spacing of each of the at least one bandwidth and information on a frequency location of each a default bandwidth.

10. The method of claim 7, wherein the DCI includes an index corresponding to the utilization bandwidth, and
wherein the DCI is transmitted according to a first DCI format that is different from a second DCI format not including a field indicating a bandwidth to be changed.

11. The method of claim 7, further comprising transmitting a message a requesting for the bandwidth change to the BS.

12. The method of claim 7, further comprising transmitting a response message corresponding to the DCI to the BS, wherein the response message indicates acknowledgement (ACK) or negative ACK (NACK).

13. A terminal in a wireless communication system, comprising:
at least one transceiver; and
at least one processor operatively coupled to the at least one transceiver,
wherein the at least one processor is configured to:
transmit, to a base station (BS), first capability information on a bandwidth supporting capability and second capability information associated with a bandwidth switching time;
receive, from the BS, via a radio resource control (RRC) signaling, configuration information on at least one bandwidth;
receive, from the BS, downlink control information (DCI) for indicating a utilization bandwidth for bandwidth change among the at least one bandwidth; and
perform the bandwidth change to the utilization bandwidth, and
wherein the DCI comprises resource allocation indicating time resources after the bandwidth switching time from a time when the DCI is received.

14. The terminal of claim 13, wherein the first capability information on the bandwidth supporting capability includes information on at least one of a maximum bandwidth supported by the terminal.

15. The terminal of claim 13, wherein the configuration information includes information on a subcarrier spacing of each of the at least one bandwidth and information on a frequency location of each of the at least one bandwidth.

16. The terminal of claim 13, wherein the DCI includes an index corresponding to the utilization bandwidth, and
wherein the DCI is transmitted according to a first DCI format which is different from a second DCI format not including a field indicating a bandwidth to be changed.

17. The terminal of claim 13, wherein the at least one processor is further configured to transmit a message requesting for the bandwidth change to the BS.

18. The terminal of claim 13, wherein the at least one processor is further configured to transmit a response message corresponding to the DCI to the BS, and
wherein the response message indicates acknowledgement (ACK) or negative ACK (NACK).

19. A base station (BS) in a wireless communication system, comprising:
at least one transceiver; and
at least one processor operatively coupled to the at least one transceiver,
wherein the at least one processor is configured to:
receive, from a terminal, first capability information on a bandwidth supporting capability and second capability information associated with a bandwidth switching time;
transmit, to the terminal via a radio resource control (RRC) signaling, configuration information on at least one bandwidth; and
transmit, to the terminal, downlink control information (DCI) for indicating a utilization bandwidth for a bandwidth change among the at least one bandwidth, and
wherein the DCI comprises resource allocation indicating time resources after the bandwidth switching time from a time when the DCI is received.

20. The BS of claim 19, wherein the first capability information on the bandwidth supporting capability includes a maximum bandwidth supported by the terminal.

21. The BS of claim 19, wherein the configuration information includes information on a subcarrier spacing of each of the at least one bandwidth and information on a frequency location of each of the at least one bandwidth.

22. The BS of claim 19,
wherein the DCI includes an index corresponding to the utilization bandwidth, and
wherein the DCI is transmitted according to a first DCI format which is different from a second DCI format not including a field indicating a bandwidth to be changed.

23. The BS of claim 19, wherein the at least one processor is further configured to receive a message requesting for the bandwidth change from the terminal.

24. The BS of claim 19,
wherein the at least one processor is further configured to receive a response message corresponding to the DCI from the terminal, and
wherein the response message indicates acknowledgement (ACK) or negative ACK (NACK).

* * * * *